US011411883B2

(12) United States Patent
Hoh et al.

(10) Patent No.: US 11,411,883 B2
(45) Date of Patent: Aug. 9, 2022

(54) HIERARCHICAL COMPUTING ARCHITECTURE FOR TRAFFIC MANAGEMENT

(71) Applicant: Toyota Motor Engineering & Manufacturing North America, Inc., Plano, TX (US)

(72) Inventors: Baik Hoh, Campbell, CA (US); Shalini Keshavamurthy, Sunnyvale, CA (US); Hao Yang, Mountain View, CA (US); BaekGyu Kim, Cupertino, CA (US); Kentaro Oguchi, Menlo Park, CA (US)

(73) Assignee: Toyota Motor Eng. & Manuf. North America. Inc., Plano, TX (US)

( * ) Notice: Subject to any disclaimer, the term of this patent is extended or adjusted under 35 U.S.C. 154(b) by 578 days.

(21) Appl. No.: 16/423,068

(22) Filed: May 27, 2019

(65) Prior Publication Data

US 2020/0382440 A1    Dec. 3, 2020

(51) Int. Cl.
*H04L 47/762* (2022.01)
*G08G 1/01* (2006.01)
*H04L 67/12* (2022.01)
*G08G 1/0968* (2006.01)

(52) U.S. Cl.
CPC ......... *H04L 47/762* (2013.01); *G08G 1/0125* (2013.01); *G08G 1/0968* (2013.01); *H04L 67/12* (2013.01)

(58) Field of Classification Search
CPC .. G08G 1/0125; G08G 1/0968; H04L 47/762; H04L 67/12
See application file for complete search history.

(56) References Cited

U.S. PATENT DOCUMENTS

| 7,188,026 | B2 | 3/2007 | Tzamaloukas |
| 8,855,900 | B2 | 10/2014 | Lection et al. |
| 2008/0095134 | A1* | 4/2008 | Chen ..................... H04W 40/32 370/342 |
| 2013/0083679 | A1* | 4/2013 | Krishnaswamy ....... H04W 4/44 370/252 |
| 2016/0027301 | A1 | 1/2016 | Publicover |
| 2016/0379486 | A1* | 12/2016 | Taylor ................ G01C 21/3691 340/905 |
| 2017/0276492 | A1* | 9/2017 | Ramasamy ...... G08G 1/096725 |

FOREIGN PATENT DOCUMENTS

| CN | 105657842 | 6/2016 |
| JP | 2009-232065 | 10/2009 |
| WO | 2016/161677 | 10/2016 |

* cited by examiner

*Primary Examiner* — Calvin Cheung
(74) *Attorney, Agent, or Firm* — VLP Law Group, LLP; Michel Bohn

(57) ABSTRACT

An example method determines a plurality of traffic sections for a geographical traffic area, each traffic section including a road segment and vehicle(s) traveling on the road segment; monitors a responsive vehicle rate for a first traffic section of the plurality of traffic sections; and assigns, based on the responsive vehicle rate of the first traffic section, the first traffic section to one of a first section server dedicated to manage the first traffic section and a remote management server capable of managing the plurality of traffic sections of the geographical traffic area, the first section server comprising computing device(s) of responsive vehicle(s) in the first traffic section.

20 Claims, 9 Drawing Sheets

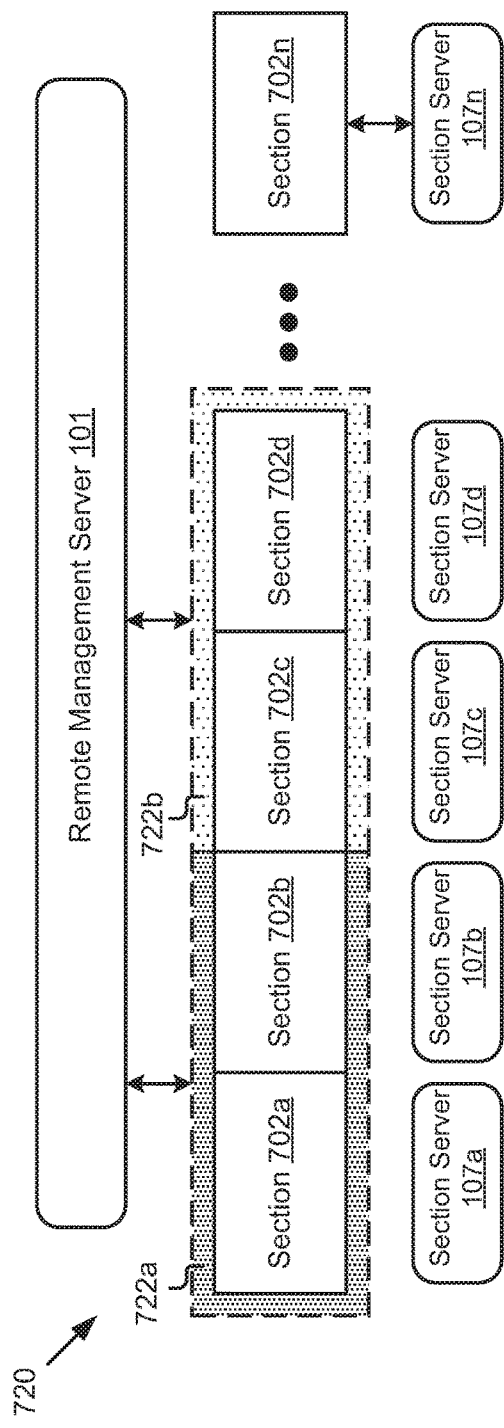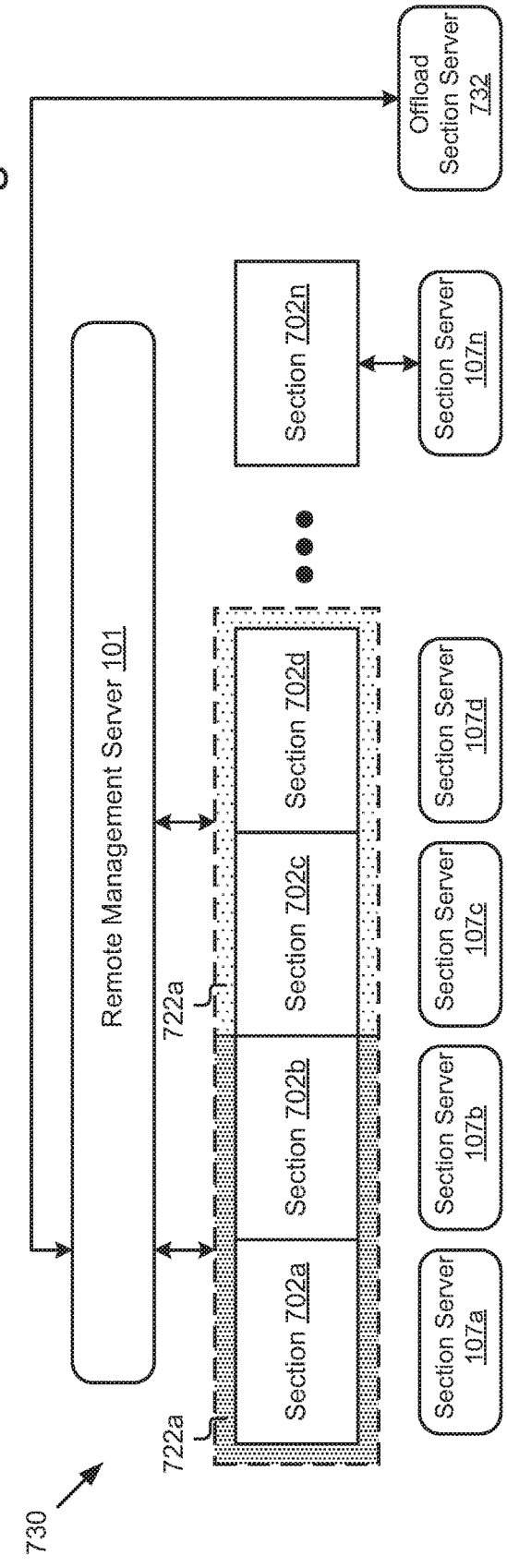

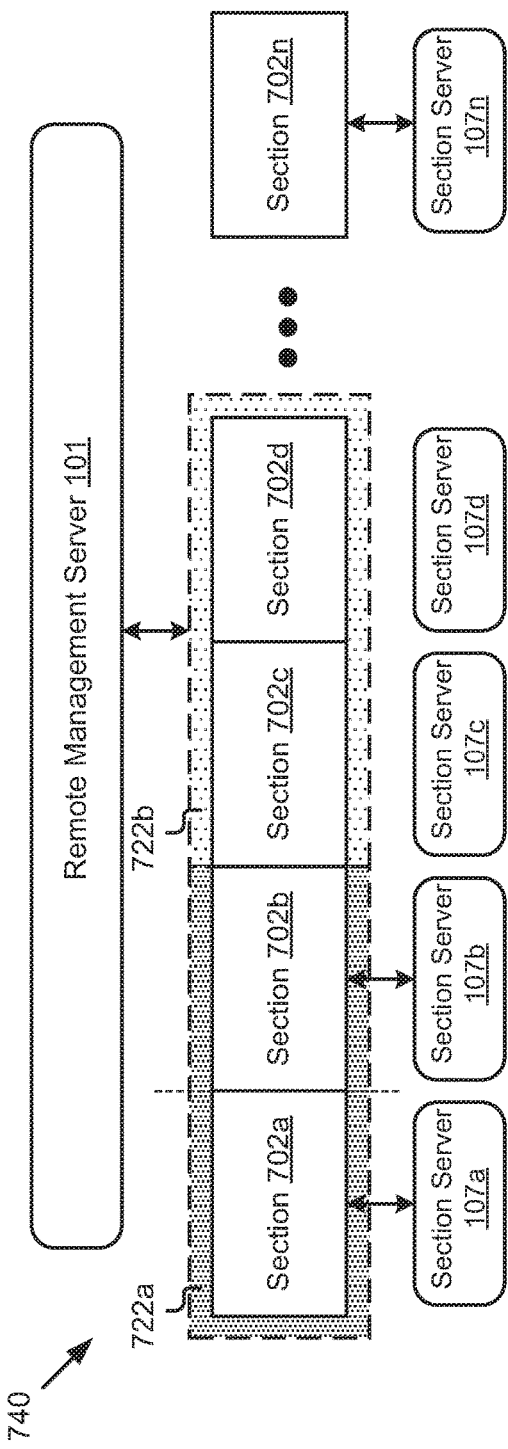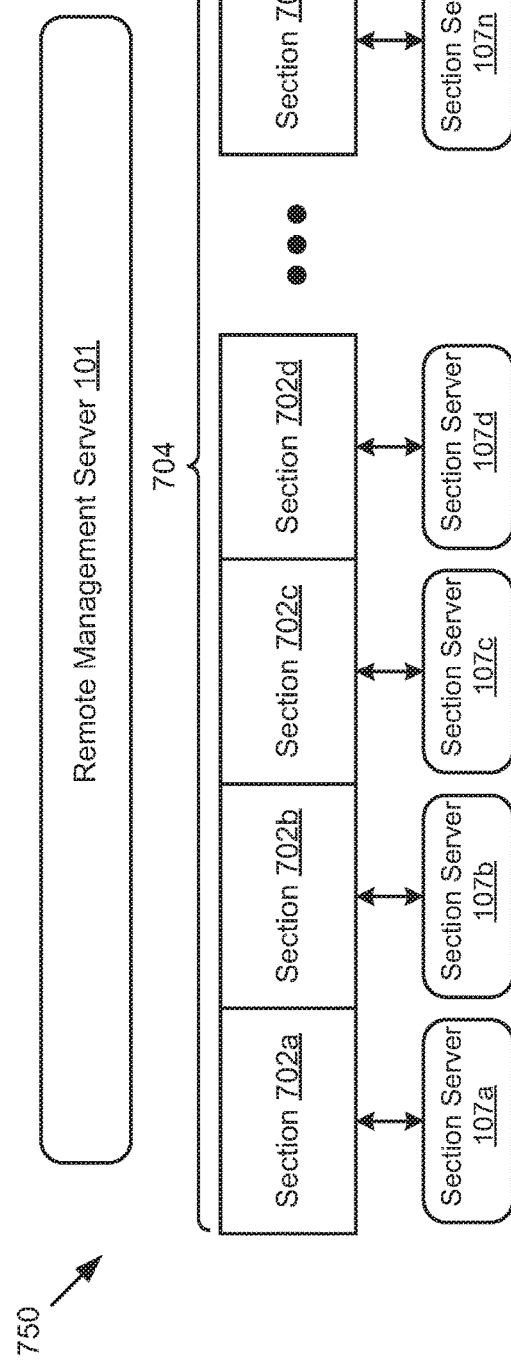

HIERARCHICAL COMPUTING ARCHITECTURE FOR TRAFFIC MANAGEMENT

BACKGROUND

The present disclosure relates to traffic management. In a more particular non-limiting example, the disclosure relates to a hierarchical computing architecture for managing traffic in geographic traffic areas.

It is challenging to efficiently perform traffic management as vehicle networks often dynamically change over time. Traffic management becomes even more challenging when traffic incidents (e.g., road construction, traffic accidents, traffic congestions, etc.) occur, because the traffic incident often blocks traffic lanes or the entire road, and thus causing a large number of vehicles to change lane or to take different roads nearby to pass through the traffic incident. Today, some modern computing systems rely on the communication between the vehicles or the communication between the vehicles and the computing server to perform the traffic management in the context of traffic incident. However, these existing solutions are generally expensive because they usually require a massive amount of computational resources of the computing server. In addition, it is generally impractical or impossible for these existing solutions to flexibly and efficiently utilize the computational resources of the computing server and the computational resources of the navigable vehicles present on the road to perform the traffic management, especially in case the number of navigable vehicles on the road may drastically change over time.

SUMMARY

The subject matter described in this disclosure overcomes the deficiencies and limitations of the existing solutions by providing novel technology for effectively managing traffic in geographical traffic areas.

According to one innovative aspect of the subject matter described in this disclosure, a computer-implemented method comprises: determining a plurality of traffic sections for a geographical traffic area, each traffic section including a road segment and one or more vehicles traveling on the road segment; monitoring a responsive vehicle rate for a first traffic section of the plurality of traffic sections; and assigning, based on the responsive vehicle rate of the first traffic section, the first traffic section to one of a first section server dedicated to manage the first traffic section and a remote management server capable of managing the plurality of traffic sections of the geographical traffic area, the first section server comprising one or more computing devices of one or more responsive vehicles in the first traffic section.

In general, another innovative aspect of the subject matter described in this disclosure may be embodied in computer-implemented methods comprising: determining a plurality of traffic sections for a geographical traffic area, each traffic section including a road segment and one or more vehicles traveling on the road segment; monitoring a traffic condition and a responsive vehicle rate for a first traffic section of the plurality of traffic sections; and assigning, based on the traffic condition and the responsive vehicle rate of the first traffic section, the first traffic section to one of a first section server dedicated to manage the first traffic section and a remote management server capable of managing the plurality of traffic sections of the geographical traffic area, the first section server comprising one or more computing devices of one or more responsive vehicles in the first traffic section.

In general, another innovative aspect of the subject matter described in this disclosure may be embodied in systems comprising: one or more processors; and one or more memories storing instructions that, when executed by the one or more processors, cause the system to: determine a plurality of traffic sections for a geographical traffic area, each traffic section including a road segment and one or more vehicles traveling on the road segment; monitor a responsive vehicle rate for a first traffic section of the plurality of traffic sections; and assign, based on the responsive vehicle rate of the first traffic section, the first traffic section to one of a first section server dedicated to manage the first traffic section and a remote management server capable of managing the plurality of traffic sections of the geographical traffic area, the first section server comprising one or more computing devices of one or more responsive vehicles in the first traffic section.

These and other implementations may each optionally include one or more of the following features: that the geographical traffic area includes a plurality of responsive vehicles and a plurality of non-responsive vehicles, and monitoring the responsive vehicle rate of the first traffic section includes determining a quantity of responsive vehicles from the plurality of responsive vehicles that are located in the first traffic section, and calculating the responsive vehicle rate of the first traffic section based on the quantity of responsive vehicles located in the first traffic section; that determining the geographical traffic area based on a severity metric of a traffic incident located downstream of the geographical traffic area, the geographical traffic area including one or more alternative travel routes, and dividing the geographical traffic area into the plurality of traffic sections; that receiving real-time traffic data for the geographical traffic area, monitoring one or more traffic metrics of the first traffic section using the real-time traffic data, determining that a traffic condition of the first traffic section is degraded based on the one or more traffic metrics of the first traffic section, determining that the responsive vehicle rate of the first traffic section does not satisfy a responsive vehicle rate threshold, and responsive to determining that the traffic condition of the first traffic section is degraded and the responsive vehicle rate of the first traffic section does not satisfy the responsive vehicle rate threshold, re-determining the geographical traffic area; that assigning the first traffic section to one of the first section server and the remote management server includes previously assigning the first traffic section to the first section server, determining that a traffic condition of the first traffic section is degraded and that the responsive vehicle rate of the first traffic section satisfies a responsive vehicle rate threshold, and responsive to determining that the traffic condition of the first traffic section is degraded and the responsive vehicle rate of the first traffic section satisfies the responsive vehicle rate threshold, determining a second traffic section located adjacent to the first traffic section among the plurality of traffic sections, aggregating the first traffic section and the second traffic section into an aggregated section, and assigning the aggregated section to the remote management server; that assigning the first traffic section to one of the first section server and the remote management server includes previously assigning the first traffic section to the remote management server, determining that a traffic condition of the first traffic section is degraded and that the responsive vehicle rate of the first traffic section satisfies a responsive vehicle rate threshold, and responsive to determining that the traffic condition of the first traffic section is degraded and the responsive vehicle rate of the first traffic section satisfies the responsive vehicle rate threshold, re-determining the geographical traffic area; that assigning the first traffic section to one of the first section server and the remote management server includes previously assigning the an aggregated section including the first traffic section and a second traffic section to the remote management server, determining that the responsive vehicle rate of the first traffic section does not satisfy a responsive vehicle rate threshold, and responsive to determining that the responsive vehicle rate of the first traffic section does not satisfy the responsive vehicle rate threshold, dividing the aggregated section into the first traffic section and the second traffic section, and assigning the first traffic section to the first section server; that assigning the first traffic section to one of the first section server and the remote management server includes previously assigning the an aggregated section including the first traffic section and a second traffic section to the remote management server, monitoring a resource amount of the remote management server that is utilized to perform one or more computational tasks for the aggregated section, determining that the resource amount associated with the aggregated section satisfies a resource amount threshold, and responsive to determining that the resource amount associated with the aggregated section satisfies the resource amount threshold, dividing the aggregated section into the first traffic section and the second traffic section, and assigning the first traffic section to the first section server; that previously assigning the an aggregated section including the first traffic section and a second traffic section to the remote management server, monitoring a resource amount of the remote management server that is utilized to perform one or more computational tasks for the aggregated section, determining that the resource amount associated with the aggregated section satisfies a resource amount threshold, and responsive to determining that the resource amount associated with the aggregated section satisfies the resource amount threshold, selecting a third section server comprising one or more computing devices of one or more responsive vehicles in a third traffic section, and transferring, to the third section server, the one or more computational tasks associated with the aggregated section, the third section server performing the one or more computational tasks; that assigning the first traffic section to one of the first section server and the remote management server includes generating, using the first section server, a first vehicle instruction for a first responsive vehicle located in the first traffic section based on vehicle data of the one or more responsive vehicles in the first traffic section, generating, using the remote management server, a second vehicle instruction for the first responsive vehicle based on the vehicle data of the one or more responsive vehicles in the first traffic section and vehicle data of one or more responsive vehicles in a second traffic section that is adjacent to the first traffic section, determining an instruction difference between the first vehicle instruction for the first responsive vehicle and the second vehicle instruction for the first responsive vehicle, determining that the instruction difference satisfies an instruction difference threshold, and responsive to determining that the instruction difference satisfies the instruction difference threshold, aggregating the first traffic section and the second traffic section into an aggregated section, and assigning the aggregated section to the remote management server.

Other implementations of one or more of these and other aspects include corresponding systems, apparatus, and computer programs, configured to perform the actions of methods, encoded on non-transitory computer storage devices.

The novel technology for managing traffic sections of a geographical traffic area presented in this disclosure is particularly advantageous in a number of respects. For example, the technology described herein is capable of dynamically assigning a traffic section of the geographical traffic area to the corresponding section server or to the remote management server based on the responsive vehicle rate of the traffic section to perform the traffic management for the traffic section. As discussed elsewhere herein, the section server may be dedicated to the traffic section and may be a local/regional server located within a predefined distance from the traffic section, or a vehicular server that is formed by one or more responsive vehicles in the traffic section. The remote management server may be a remote server capable of managing multiple traffic sections of the geographical traffic area and may be operated by a third party. Therefore, the remote management server can use vehicle data of the responsive vehicles in various traffic sections to perform the traffic management more efficiently. However, the traffic management performed by the remote management server usually results in higher resource usage cost and higher communication latency as compared to the traffic management performed by the section server associated with the traffic section.

The technology described herein can dynamically assign each traffic section of the geographical traffic area to the corresponding section server or the remote management server based on the traffic condition of the traffic section, the responsive vehicle rate of the traffic section, and/or the resource amount of the remote management server required to perform the traffic management for the traffic section, etc. As a result, the present technology can manage the responsive vehicles in the traffic section to mitigate the traffic incident with an optimal balance between the effectiveness of the traffic management, the communication latency, the resource usage cost, etc., according to the dynamic change in the responsive vehicle rate of the traffic section. The technology described herein is also capable of adjusting the geographical traffic area if needed to effectively perform the traffic management for the traffic sections, thereby efficiently addressing the heavy traffic caused by the traffic incident.

It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

BRIEF DESCRIPTION OF THE DRAWINGS

FIG. 7A-7C are block diagrams illustrating example system architectures of the system for managing the traffic sections in a distributed management state, a centralized management state, and a hybrid management state, respectively.

FIG. 7D is a block diagram illustrating an example system architecture of the system for managing the traffic sections as an offload section server is utilized to perform the traffic management for an aggregated section.

FIG. 7E is a block diagram illustrating an example system architecture of the system for managing the traffic sections as the aggregated section is divided into individual traffic sections.

FIG. 7F is a block diagram illustrating an example system architecture of the system for managing the traffic sections as the geographical traffic area is adjusted.

DESCRIPTION

Figure 1:
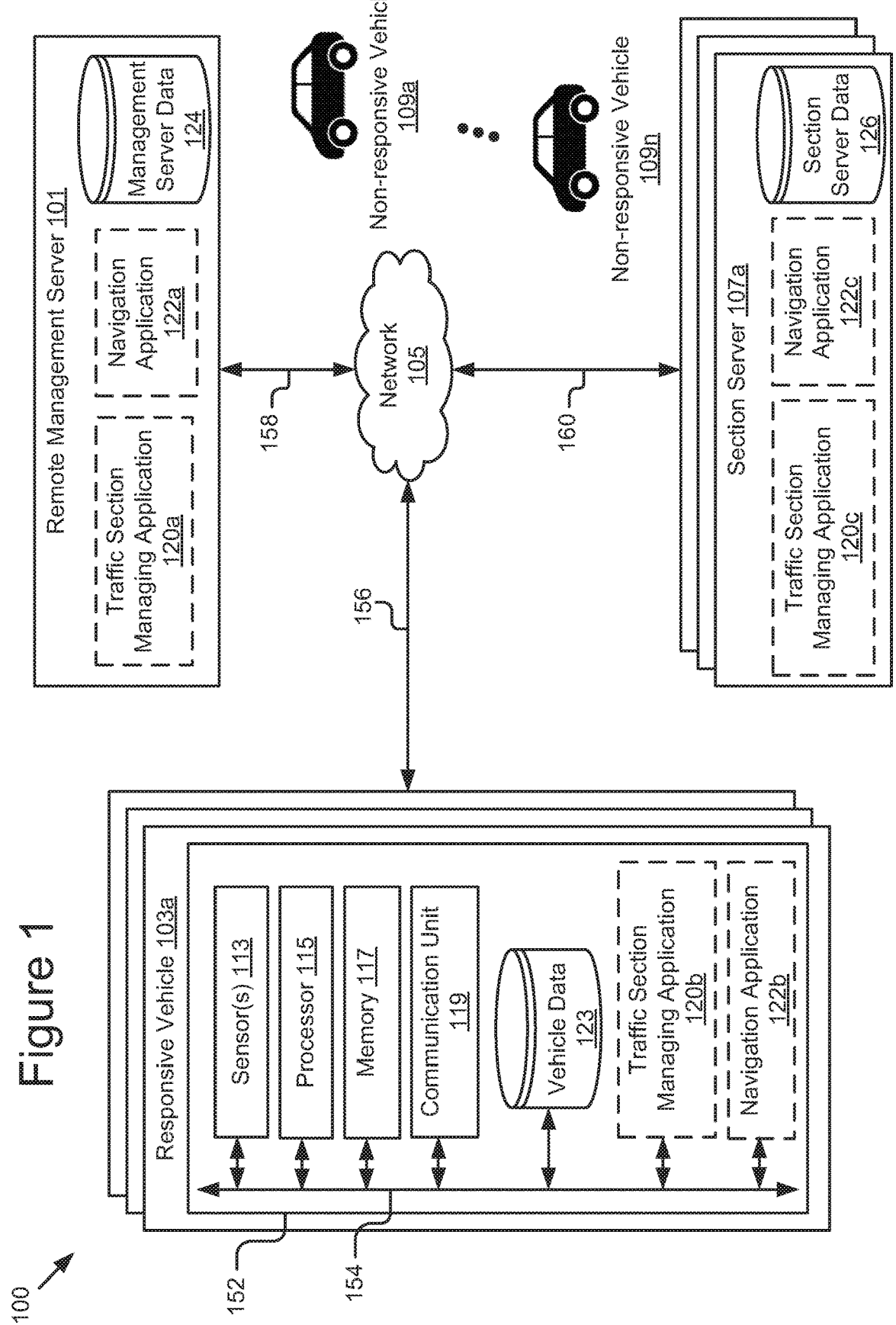
FIG. 1 is a block diagram of an example system for managing traffic sections of a geographical traffic area.

The technology described herein can effectively and efficiently manage traffic sections of a geographical traffic area. As described in further detail below, the technology includes various aspects, such as traffic section management methods, systems, computing devices, computer program products, and apparatuses, among other aspects.

The present technology can provide a hierarchical system with a dynamic system architecture that enables the traffic management for a traffic section to be flexibly executed at different computing entities of the system (e.g., remote management server, section servers, offload section server, etc.) depending on the responsive vehicle rate, the communication latency, the resource amount to perform the traffic management for the traffic section, etc. As an example, the present technology may flexibly group multiple traffic sections into a larger region, and assign the larger region to the global computing entity (e.g., remote management server). The global computing entity can manage the responsive vehicles in the larger region in centralized computation mode. As discussed elsewhere herein, the global computing entity generally has high processing capability but the traffic management performed by the global computing entity is usually expensive and subjected to high communication latency. As another example, the present technology may flexibly divide the larger region into smaller traffic sections, and assign the traffic sections to the local computing entities (e.g., traffic section servers). The local computing entity can manage the responsive vehicles in the corresponding traffic section in decentralized computation mode. As discussed elsewhere herein, the local computing entity generally has limited processing capability but it is capable of performing the traffic management with relatively low cost and low communication latency.

The technology described herein can flexibly apply the suitable computation mode and dynamically transition the computational tasks for managing the traffic in the traffic section to the suitable computing entity of the system, thereby obtaining the optimal balance between the effectiveness of the traffic management and the resource usage cost. The transition of the computational tasks between computing entities of the system may be triggered by the traffic condition that reflects the effectiveness of the traffic management operation, the resource availability of the global computing entity (e.g., cloud server) and the local computing entities (e.g., vehicular servers), the communication cost (e.g., V2V and V2I communication latency), the vehicle location of the responsive vehicles that form the offload section server in which the offload section server can be temporarily recruited to perform the traffic management for the traffic section, etc.

An example traffic section management system may determine a geographical traffic area based on a traffic incident, the geographical traffic area may be located upstream of the traffic incident and include one or more alternative routes for the vehicles to get around the traffic incident and proceed forward. In some embodiments, the traffic section management system may divide the geographical traffic area into one or more traffic sections, each traffic section may be associated with a section server that is dedicated to manage the responsive vehicles in the traffic section. In some embodiments, the section server may be a vehicular server being formed by the computing devices of one or more responsive vehicles located in the traffic section. In some embodiments, the traffic section management system may assign each traffic section in the geographical traffic area to the section server associated with the traffic section, or to the remote management server capable of managing multiple traffic sections of the geographical traffic area. Each traffic section may be assigned to the corresponding section server or to the remote management server based on the traffic condition of the traffic section, the responsive vehicle rate indicating the quantity of responsive vehicles in the traffic section, and/or the resource amount of the remote management server required to perform the traffic management for the traffic section, etc. In some embodiments, the section server or the remote management server to which the traffic section is assigned may perform the traffic management for the traffic section to resolve the heavy traffic caused by the traffic incident. For example, the section server or the remote management server may receive the vehicle data from the responsive vehicles located within the traffic section, determine driving context, determine optimal driving maneuvers and/or optimal vehicle route for each responsive vehicle in the traffic section to proceed, and provide vehicle instructions to the responsive vehicle accordingly.

FIG. 1 is a block diagram of an example system 100 for managing traffic sections of a geographical traffic area. As shown, the system 100 includes a remote management server 101, one or more responsive vehicles 103a . . . 103n, one or more section servers 107a . . . 107n, and one or more non-responsive vehicles 109a . . . 109n. The remote management server 101, the responsive vehicles 103a . . . 103n, and the section servers 107a . . . 107n may be coupled for electronic communication via a network 105. In FIG. 1 and the remaining figures, a letter after a reference number, e.g., "103a," represents a reference to the element having that particular reference number. A reference number in the text without a following letter, e.g., "103," represents a general reference to instances of the element bearing that reference number. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of responsive vehicles 103, non-responsive vehicles 109, section servers 107, remote management servers 101, or networks 105.

The network 105 may be a conventional type, wired and/or wireless, and may have numerous different configurations including a star configuration, token ring configuration, or other configurations. For example, the network 105 may include one or more local area networks (LAN), wide area networks (WAN) (e.g., the Internet), personal area networks (PAN), public networks, private networks, virtual networks, virtual private networks, peer-to-peer networks, near-field networks (e.g., Bluetooth®, NFC, etc.), vehicular networks, and/or other interconnected data paths across which multiple devices may communicate.

The network 105 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOW), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 105 is a wireless network using a connection such as DSRC (Dedicated Short Range Communication), WAVE, 802.11p, a 3G, 4G, 5G+ network, WiFi™, satellite networks, vehicle-to-vehicle (V2V) networks, vehicle-to-infrastructure/infrastructure-to-vehicle (V2I/I2V) networks, vehicle-to-infrastructure/vehicle-to-everything (V2I/V2X) networks, or any other wireless networks. Although FIG. 1 illustrates a single block for the network 105 that couples to the remote management server 101, the responsive vehicle(s) 103, and the section server(s) 107, it should be understood that the network 105 may in practice comprise any number of combination of networks, as noted above.

The responsive vehicle 103 may be a vehicle platform that is capable of communicating with other computing entities of the system 100. In some embodiments, the responsive vehicle 103 may be responsive to the vehicle instructions generated by its on-board processors and/or received via a computer network (e.g., the network 105), and thus the responsive vehicle 103 is capable of being controlled to manage the traffic and mitigate the traffic incident. On the other hand, the non-responsive vehicle 109 may be a vehicle platform that lacks the capability of being controlled to manage the traffic and mitigate the traffic incident, or has such capability but is restricted from or incapable of using it due to various reasons (e.g., system errors, power loss, opt-out settings, etc.). The responsive vehicles 103 and the non-responsive vehicles 109 may be commonly referred to herein as vehicle(s), and these vehicles are capable of transporting from one point to another. Non-limiting examples of the vehicle include an automobile, a bus, a boat, a plane, a bionic implant, a robot, or any other vehicle platforms.

The responsive vehicle 103 may include computing device(s) 152 having sensor(s) 113, processor(s) 115, memory(ies) 117, communication unit(s) 119, vehicle data store(s) 123, a traffic section managing application 120, and a navigation application 122. Examples of the computing device 152 may include virtual or physical computer processors, control units, micro-controllers, etc., which are coupled to other components of the responsive vehicle 103, such as one or more sensors 113, actuators, motivators, etc. The responsive vehicle 103 may be coupled to the network 105 via signal line 156, and may send and receive data to and from other responsive vehicle(s) 103, the section server(s) 107, and/or the remote management server 101. In some embodiments, the responsive vehicle 103 may be temporarily coupled to the section servers 107 as the responsive vehicle 103 travels along the roads. For example, the responsive vehicle 103 may send and receive data to and from a section server 107 as the responsive vehicle 103 is located within the traffic section managed by the section server 107. Thus, the section server 107 may generate and provide vehicle instructions for the responsive vehicle 103 to navigate accordingly, thereby managing the traffic in the traffic section of the section server 107 to mitigate the traffic incident.

The processor 115 may execute software instructions (e.g., tasks) by performing various input/output, logical, and/or mathematical operations. The processor 115 may have various computing architectures to process data signals. The processor 115 may be physical and/or virtual, and may include a single core or plurality of processing units and/or cores. In the context of the responsive vehicle 103, the processor may be an electronic control unit (ECU) implemented in the responsive vehicle 103 such as a car, although other types of platform are also possible and contemplated. The ECU may receive and store the sensor data as vehicle operation data in the vehicle data store 123 for access and/or retrieval by the traffic section managing application 120, the navigation application 122, and/or other vehicle applications. In some implementations, the processor 115 may be capable of generating and providing electronic display signals to input/output device(s), performing complex tasks including various types of data analysis and traffic section management, etc. In some embodiments, the processor 115 may be coupled to the memory 117 via the bus 154 to access data and instructions therefrom and store data therein. The bus 154 may couple the processor 115 to the other components of the responsive vehicle 103 including, for example, the sensor 113, the memory 117, the communication unit 119, and/or the vehicle data store 123.

The traffic section managing application 120 is computer logic executable to manage the traffic sections of section servers 107. As illustrated in FIG. 1, the remote management server 101 may include the instance 120a, the responsive vehicles 103a . . . 103n may include the instances 120b . . . 120m, and the section servers 107a . . . 107n may include the instances 120c . . . 120n of the traffic section managing application 120. In some embodiments, each instance 120a, 120b . . . 120m, and 120c . . . 120n may comprise one or more components the traffic section managing application 120 depicted in FIG. 2, and may be configured to fully or partially perform the functionalities described herein depending on where the instance resides. In some embodiments, the traffic section managing application 120 may be implemented using software executable by one or more processors of one or more computer devices, using hardware, such as but not limited to a field-programmable gate array (FPGA), an application-specific integrated circuit (ASIC), etc., and/or a combination of hardware and software, etc. The traffic section managing application 120 may receive and process vehicle data, server data, etc., and may communicate with other elements of the responsive vehicle 103 via the bus 154, such as the memory 117, the communication unit 119, the vehicle data store 123, etc. The traffic section managing application 120 is described in details below with reference to at least FIGS. 2-7F.

The navigation application 122 is computer logic executable to provide navigational guidance to the responsive vehicle 103. As illustrated in FIG. 1, the remote management server 101 may include the instance 122a, the responsive vehicles 103a . . . 103n may include the instances 122b . . . 122m, and the section servers 107a . . . 107n may include the instances 122c . . . 122n of the navigation application 122. In some embodiments, the navigation application 122 may be implemented using software executable by one or more processors of one or more computer devices, using hardware, such as but not limited to a field-programmable gate array (FPGA), an application-specific integrated circuit (ASIC), etc., and/or a combination of hardware and software, etc. In some embodiments, the navigation application 122 may determine an optimal vehicle route to get around the traffic incident, generate navigation instructions corresponding to the vehicle route, and provide the navigation instructions to the responsive vehicle 103 or to the user of the responsive vehicle 103 via the input/output device of the responsive vehicle 103. In some embodiments, the navigation application 122 may perform path planning to determine driving maneuvers for the responsive vehicle 103 to proceed through the road segment including the traffic incident (e.g., make a lane change to the left lane), and provide driving instructions describing the driving maneuvers to the responsive vehicle 103 or to the user of the responsive vehicle 103 via the input/output device of the responsive vehicle 103.

In some embodiments, the navigation application 122 may analyze the vehicle data received from multiple responsive vehicles 103 to determine driving context, and determine optimal vehicle route and/or optimal driving maneuvers for each responsive vehicle 103. Thus, as the navigation application 122 can collect relevant data from multiple responsive vehicles 103 located within the same traffic section or within one or more adjacent traffic sections, the navigation application 122 can effectively coordinate the vehicle movement of these responsive vehicles 103, thereby quickly address the heavy traffic caused by the traffic incident. It should be understood that in addition to the navigation application 122, other vehicle applications may also be implemented in the responsive vehicles 103, the section servers 107, and/or the remote management server 101.

The memory 117 includes a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor 115. For example, the memory 117 may store the traffic section managing application 120 and/or the navigation application 122. In some implementations, the memory 117 may include one or more of volatile memory and non-volatile memory. For example, the memory 117 may include one or more of a dynamic random access memory (DRAM) device, a static random access memory (SRAM) device, a discrete memory device (e.g., a PROM, FPROM, ROM, etc.), a hard disk drive, an optical disk drive (CD, DVD, Blue-Ray™, etc.), etc. It should be understood that the memory 117 may be a single device or may include multiple types of devices and configurations.

The communication unit 119 transmits data to and receives data from other computing devices to which it is communicatively coupled (e.g., via the network 105) using wireless and/or wired connections. The communication unit 119 may include one or more wired interfaces and/or wireless transceivers for sending and receiving data. The communication unit 119 may couple to the network 105 and communicate with other entities of the system 100, such as other responsive vehicle(s) 103, the remote management server 101, and/or the section server 107 associated with the traffic section in which the responsive vehicle 103 is located, etc. The communication unit 119 may exchange data with other computing nodes using standard communication methods, such as those discussed above.

The sensor(s) 113 includes any type of sensors suitable for the responsive vehicle(s) 103. The sensor(s) 113 may be configured to collect any type of signal data suitable to determine characteristics of the responsive vehicle 103 and/or its internal and external environments. Non-limiting examples of the sensor(s) 113 include various optical sensors and/or image sensors (CCD, CMOS, 2D, 3D, light detection and ranging (LIDAR), cameras, etc.), audio sensors, motion detection sensors, barometers, altimeters, thermocouples, moisture sensors, infrared (IR) sensors, radar sensors, gyroscopes, accelerometers, speedometers, steering sensors, braking sensors, switches, vehicle indicator sensors, geo-location sensors (e.g., Global Positioning System (GPS) sensors), orientation sensor, wireless transceivers (e.g., cellular, WiFi™, near-field, etc.), sonar sensors, ultrasonic sensors, touch sensors, distance sensors, etc. In some embodiments, one or more sensors 113 may include externally facing sensors provided at the front side, rear side, right side, and/or left side of the responsive vehicle 103 to capture the situational context surrounding the responsive vehicle 103.

The vehicle data store 123 includes a non-transitory storage medium that stores various types of data. For example, the vehicle data store 123 may store vehicle data being communicated between different components of a given responsive vehicle 103 using a bus, such as a controller area network (CAN) bus. In some embodiments, the vehicle data may include vehicle operation data collected from multiple sensors 113 coupled to different components of the responsive vehicle 103 for monitoring operating states of these components, e.g., the vehicle speed, the vehicle acceleration/deceleration rate, the wheel speed, the steering angle, the braking force, etc. In some embodiments, the vehicle data may also include the vehicle location (e.g., GPS coordinates) indicating the geographic location of the responsive vehicle 103, the moving direction of the responsive vehicle 103, the following distance between the responsive vehicle 103 and the proximate vehicles in front and behind the responsive vehicle 103, the vehicle route currently followed by the responsive vehicle 103 to get to a destination, etc. Other types of data stored in the vehicle data store 123 are also possible and contemplated.

The section server 107 is a hardware and/or virtual server that includes a processor, a memory, and network communication capabilities (e.g., a communication unit). As depicted in FIG. 1, the section server 107 may be communicatively coupled to the responsive vehicles 103 located within its traffic section, the remote management server 101, and/or other entities of the system 100 via the network 105 as reflected by signal line 160. In some embodiments, the section server 107 may be dedicated to manage a traffic section within a geographical traffic area. Thus, the section server 107 may communicate with the vehicular traffic in this traffic section, and perform the traffic management for this traffic section. For example, the section server 107 may send and receive data to and from the responsive vehicles 103 located within the traffic section, and manage the vehicle movement of these responsive vehicles 103 to resolve the heavy traffic and mitigate the traffic incident.

In some embodiments, the section server 107 may be a physical server 107 or a virtual server 107 implemented on a physical computing entity. The physical server 107 or the physical computing entity on which the virtual server 107 resides may be located at a lower distance from the traffic section of the section server 107 as compared to the remote management server 101. In some embodiments, the section server 107 may be a vehicular server formed by one or more responsive vehicles 103 located within the traffic section of the section server 107. For example, the section server 107 may comprise the computing devices 152 of one or more responsive vehicles 103 located within its traffic section, and thus these responsive vehicles 103 may contribute computational resources and collaboratively perform the functionalities of the section server 107. As the responsive vehicles 103 may dynamically enter and leave the traffic section as they proceed on the road, the responsive vehicles 103 that form the section server 107 and the resource capacity of the section server 107 may dynamically change over time.

As depicted in FIG. 1, the section server 107 may include an instance 120c of the traffic section managing application 120, an instance 122b of the navigation application 122, and a section server data store 126 that stores various types of data for access and/or retrieval by these applications. In some embodiments, the section server data store 126 includes a non-transitory storage medium that stores the section data describing the traffic section being managed by the section server 107. The section data may include the section identifier (ID), the section location (e.g., GPS coordinates), the coverage region of the traffic section (e.g., shape and size), the roadway structure of the traffic section (e.g., freeway exit, intersection, etc.), etc.

In some embodiments, the section server data store 126 may store real-time traffic data including various traffic metrics that describe the traffic condition in the traffic section of the section server 107. Non-limiting examples of the traffic metrics include the vehicle density indicating the number of vehicles present on a predefined distance of the traffic section (e.g., 60 vehicles/km), the traffic flow rate indicating the number of vehicles passing a static point in the traffic section during a predefined time period (e.g., 1500 vehicles/h), the average vehicle speed (e.g., 30 mph) and the average following distance (e.g., 3 m) of the vehicles travelling in the traffic section, etc. In some embodiments, the section server data store 126 may also store the responsive vehicle rate indicating the quantity of responsive vehicles 103 that are located in the traffic section of the section server 107 (e.g., 45 responsive vehicles). As the responsive vehicles 103 may dynamically enter and leave the traffic section as they proceed on the road, the number of responsive vehicles 103 present in the traffic section may dynamically change over time. In some embodiments, the section server data store 126 may also store the current management state that is currently applied to the traffic section of the section server 107 (e.g., centralized state, distributed state, hybrid state, etc.), and/or the server that currently manages the traffic section (e.g., the section server 107 associated with the traffic section, the remote management server 101, etc.). Other types of data stored in the section server data store 126 are also possible and contemplated.

The remote management server 101 includes a hardware and/or virtual server that includes a processor, a memory, and network communication capabilities (e.g., a communication unit). In some embodiments, the remote management server 101 may be a computing server located remotely from the geographical traffic area and operated by a third party. For example, the remote management server 101 may be a cloud server residing in a third-party data center. Therefore, the traffic management performed by the remote management server 101 may incur higher communication latency and/or higher resource usage cost as compared to the section servers 107 associated with the traffic sections. As depicted in FIG. 1, the remote management server 101 may be communicatively coupled to the network 105 as reflected by signal line 158, and may send and receive data to and from other entities of the system 100 (e.g., the section servers 107, the responsive vehicles 103, etc.) via the network 105.

As depicted in FIG. 1, the remote management server 101 may include an instance 120a of the traffic section managing application 120, an instance 122a of the navigation application 122, and a management server data store 124 that stores various types of data for access and/or retrieval by these applications. In some embodiments, the management server data store 124 includes a non-transitory storage medium that stores geographical area data describing the geographical traffic area being managed by the remote management server 101. The geographical area data may include the traffic incident location (e.g., GPS coordinates), the geographical area location (e.g., GPS coordinates), the coverage region of the geographical traffic area (e.g., shape and size), the potential travel routes for the vehicles in the geographical traffic area, etc. As discussed elsewhere herein, the geographical traffic area may be divided into one or more traffic sections. For each traffic section, the management server data store 124 may store the section data describing the traffic section. As discussed elsewhere herein, the section data of the traffic section may include the section ID, the section location, the coverage region of the traffic section, the roadway structure of the traffic section, the traffic condition of the traffic section (e.g., the vehicle density, the traffic flow rate, the average vehicle speed, the average following distance, etc.), the responsive vehicle rate of the traffic section (e.g., 30 responsive vehicles), etc.

In some embodiments, for each traffic section, the management server data store 124 may store the current management state that is currently applied to the traffic section, and/or the server that currently manages the traffic section (e.g., the section server 107 associated with the traffic section, the remote management server 101, etc.). In some embodiments, the traffic sections in the geographical traffic area may be managed in the distributed management state, the centralized management state, the hybrid management state, etc. As depicted in the example system architecture 700 in FIG. 7A, in the distributed management state, each traffic section 702 of the geographical traffic area 704 may be individually managed by the section server 107 associated with the traffic section 702. Thus, the corresponding section server 107 may receive the vehicle data of the responsive vehicles 103 located within the traffic section 702, and compute the vehicle instructions for these responsive vehicles 103 to manage the traffic in this traffic section. As depicted in the example system architecture 710 in FIG. 7B, in the centralized management state, all traffic sections 702 of the geographical traffic area 704 may be managed by the remote management server 101. Thus, the remote management server 101 may receive the vehicle data of the responsive vehicles 103 located within the traffic sections 702, and compute the vehicle instructions for these responsive vehicles 103 to commonly manage the traffic in these traffic sections. As the remote management server 101 may rely on relevant data of the responsive vehicles 103 in multiple traffic sections 702 to compute the vehicle instructions, the remote management server 101 may perform the traffic management for these traffic sections 702 more effectively.

As depicted in FIG. 7C, in the hybrid management state, one or more traffic sections 702 may be individually managed by their corresponding section server 107, and other traffic sections 702 may be grouped into one or more aggregated sections 722 that are managed by the remote management server 101. Thus, for each aggregated section 722, the remote management server 101 may receive the vehicle data of the responsive vehicles 103 located within multiple traffic sections 702 that are included in the aggregated section 722, and compute the vehicle instructions for these responsive vehicles 103 to commonly manage the traffic in these traffic sections. In some embodiments, for each aggregated section 722, the management server data store 124 may store the aggregated section ID of the aggregated section and the section IDs of the traffic sections 702 included in the aggregated section. In some embodiments, for the centralized management state, the management server data store 124 may store the resource amount of the remote management server 101 that is consumed to perform the traffic management for each traffic section 702. For the hybrid management state, the management server data store 124 may store the resource amount of the remote management server 101 that is consumed to perform the traffic management for each aggregated section 722. It should be understood that other management states are also possible and contemplated.

Other variations and/or combinations are also possible and contemplated. It should be understood that the system 100 in FIG. 1 is merely an example system and that a variety of different system environments and configurations are contemplated and are within the scope of the present disclosure. For example, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2:
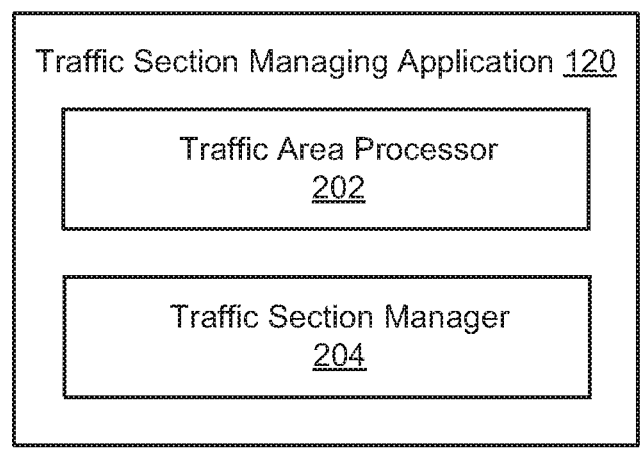
FIG. 2 is a block diagram of an example traffic section managing application.

FIG. 2 is a block diagram of an example traffic section managing application 120. As depicted, the traffic section managing application 120 may include a traffic area processor 202 and a traffic section manager 204, although it should be understood that the traffic section managing application 120 may include additional components such as, but not limited to, a configuration engine, a training engine, etc., and/or these various components may be combined into a single engine or divided into additional engines. The traffic area processor 202 and the traffic section manager 204 may be implemented as software, hardware, or a combination of the foregoing. In some embodiments, the traffic area processor 202 and the traffic section manager 204 may be communicatively coupled by the bus 154 and/or the processor 115 to one another and/or to other components of the computing device 152. In some embodiments, one or more of the components 120, 202, and/or 204 are sets of instructions executable by the processor 115 to provide their functionality. In further embodiments, one or more of the components 120, 202, and/or 204 are storable in the memory 117 and are accessible and executable by the processor 115 to provide their functionality. In any of the foregoing embodiments, these components 120, 202, and/or 204 may be adapted for cooperation and communication with the processor 115 and other components of the computing device 152. The traffic section managing application 120 and its components 202 and 204 are described in further detail below with reference to at least FIGS. 3-7F.

Figure 3:
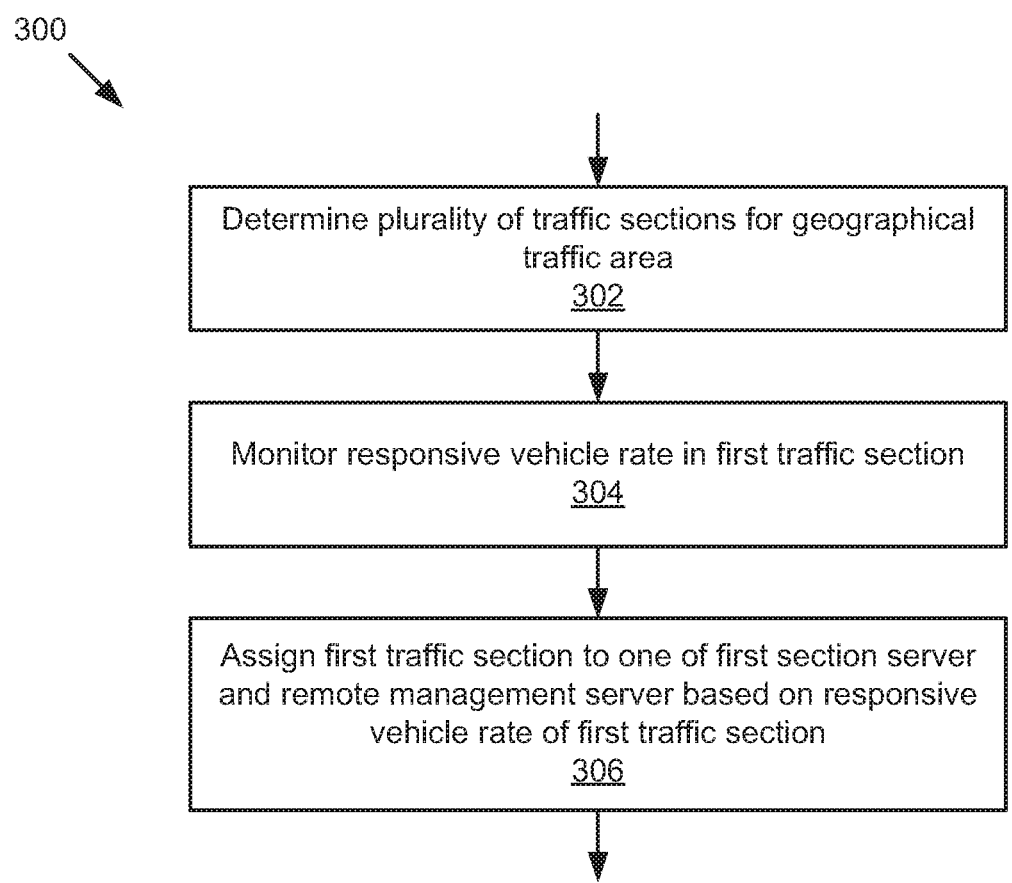
FIG. 3 is a flowchart of an example method for managing the traffic sections.

FIG. 3 is a flowchart of an example method 300 for managing the traffic sections in the geographical traffic area to perform the traffic management for these traffic sections in an effective manner. In some embodiments, the geographical traffic area may be located upstream of a traffic incident (e.g., road construction, traffic accident, etc.), and thus the traffic in the geographical traffic area may be managed through the responsive vehicles 103 to resolve the heavy traffic caused by the traffic incident. In block 302, the traffic section manager 204 may determine a plurality of traffic sections for the geographical traffic area, each traffic section may include one or more road segments and one or more vehicles traveling on the road segments. In some embodiments, each traffic section may be associated with a section server 107 dedicated to manage the traffic in the traffic section. As discussed elsewhere herein, the section server 107 may be a local/regional server or a vehicular server that is formed by the computing devices 152 of one or more responsive vehicles 103 located within the first traffic section.

Figure 7A:
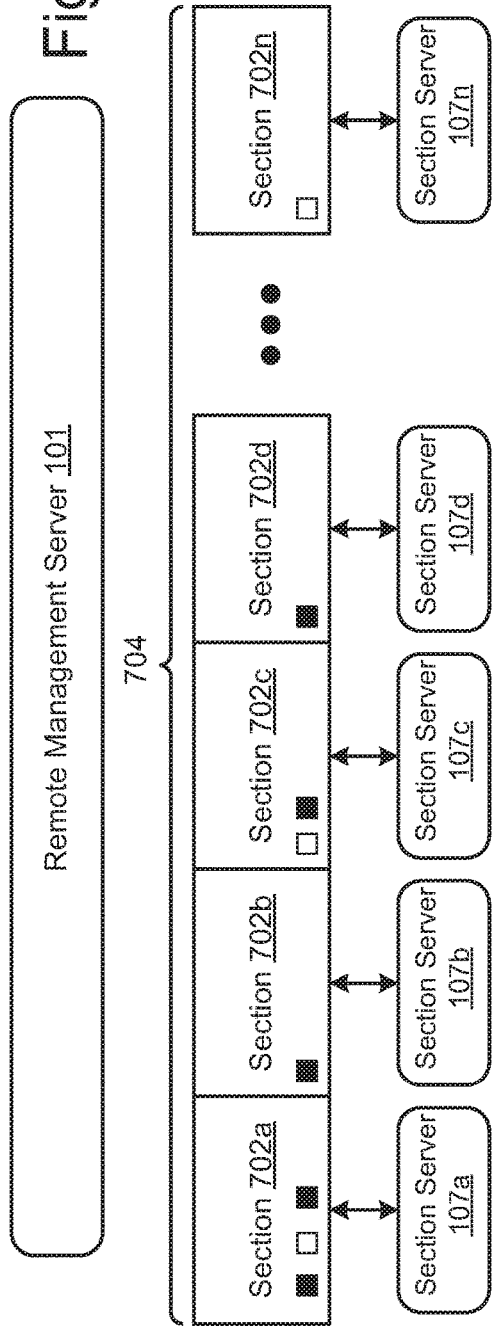
Figure 7B:
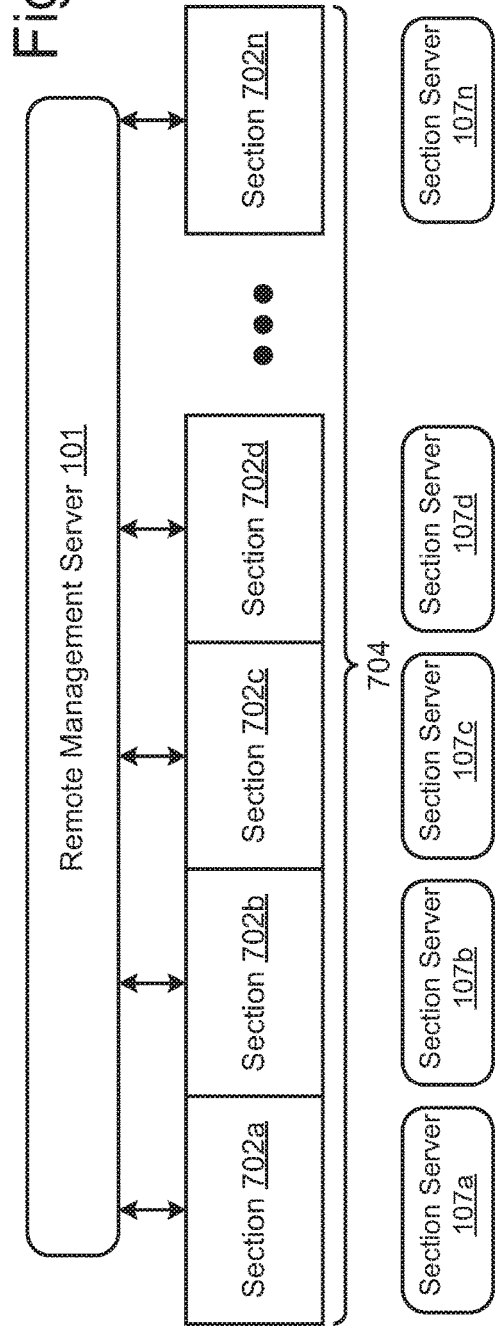

In block 304, the traffic section manager 204 may monitor a responsive vehicle rate for each traffic section in the geographical traffic area. As depicted in FIG. 7A, each traffic section in the geographical traffic area may include one or more responsive vehicles 103 and/or one or more non-responsive vehicles 109. In some embodiments, the responsive vehicle rate of a first traffic section in the geographical traffic area may indicate the number of responsive vehicles 103 located within the first traffic section. The responsive vehicle rate may also be referred to herein as the penetration rate.

In block 306, the traffic section manager 204 may assign the first traffic section to one of the first section server 107 dedicated to manage the first traffic section and the remote management server 101 based on the responsive vehicle rate of a first traffic section. Thus, the first section server 107 or the remote management server 101 to which the first traffic section is assigned may perform the traffic management for the first traffic section. In some embodiments, to perform the traffic management for the first traffic section, the navigation application 122 implemented on the first section server 107 or on the remote management server 101 may receive the vehicle data of the responsive vehicles 103 located in the first traffic section, determine travel route and/or driving maneuvers for the responsive vehicles 103, and generate vehicle instructions for these responsive vehicles 103 to coordinate their vehicle movement. For example, the navigation application 122 may redirect one or more first responsive vehicles 103 to a first alternative route, and redirect one or more second responsive vehicles 103 to a second alternative route in the first traffic section. As a result, the number of vehicles proceeding towards the traffic incident may be reduced, thereby addressing the heavy traffic caused by the traffic incident.

Figure 4:
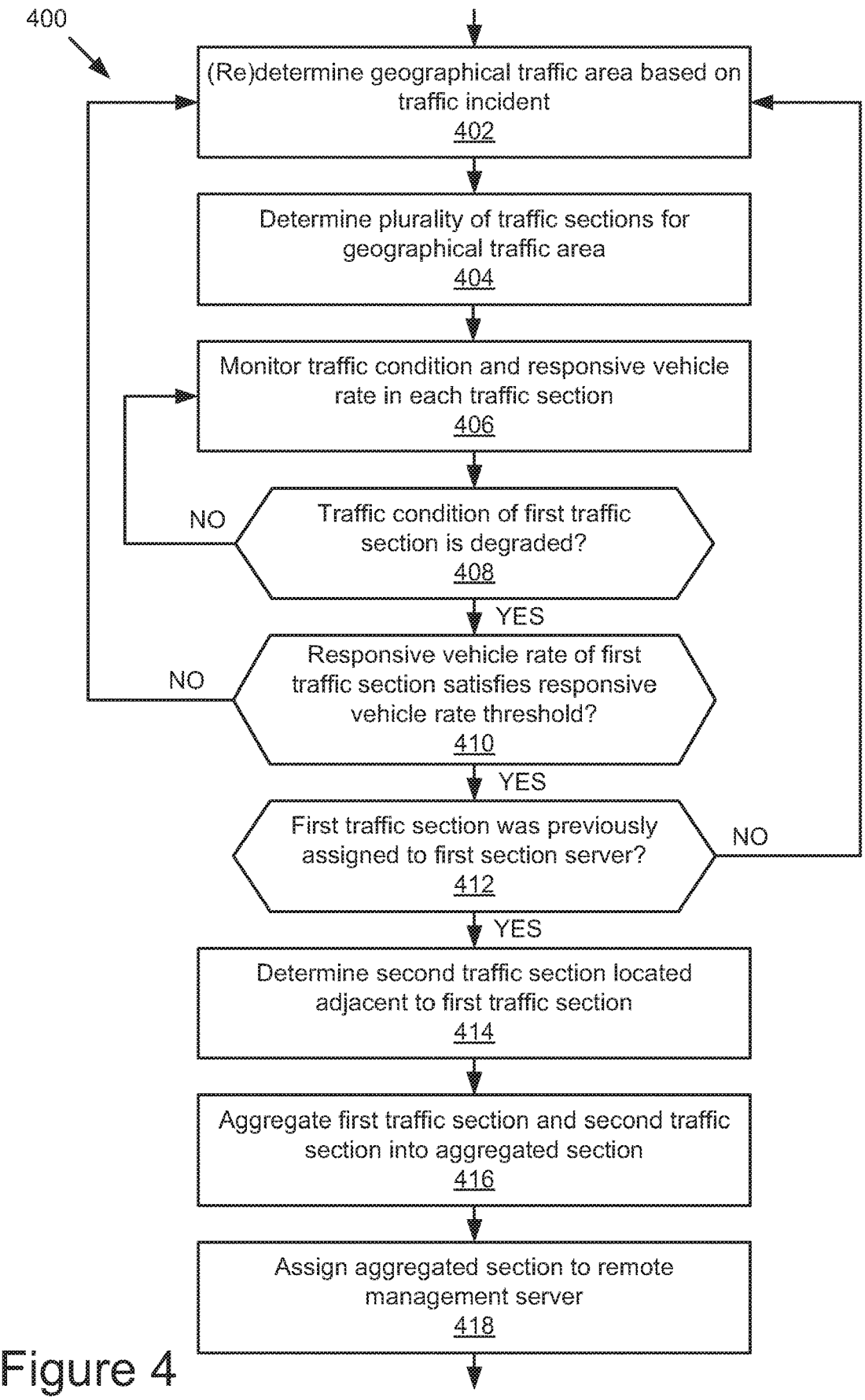
FIGS. 4-6 are flowcharts of other example methods for managing the traffic sections.

FIG. 4 is a flowchart of an example method 400 for managing the traffic sections in the geographical traffic area. In block 402, the traffic area processor 202 may determine the geographical traffic area based on a traffic incident. In some embodiments, the traffic area processor 202 may detect or receive information about the traffic incident. The traffic incident may block a portion or the entire road segment, and thus causing heavy or congested traffic due to traffic obstruction. Non-limiting examples of the traffic incident include a road construction, a traffic accident, a traffic congestion, etc. In some embodiments, the traffic area processor 202 may determine or receive the traffic incident location and the severity metric of the traffic incident. The severity metric may indicate a potential impact of the traffic incident on the upstream traffic, and may be determined based on the incident area occupied by the traffic incident (e.g., 150 m), the roadway structure of the incident area (e.g., intersection, freeway entrance, etc.), the current date and time (e.g., peak hour on weekday), etc. In some embodiments, the traffic area processor 202 may determine the geographical traffic area to be subjected to traffic management based on the traffic incident location and the severity metric of the traffic incident. In some embodiments, the traffic incident may be located downstream of the geographical traffic area, and the geographical traffic area may include one or more alternative travel routes for the vehicles to avoid the traffic incident. In some embodiments, the number of alternative travel routes included in the geographical traffic area may be directly proportional to the severity metric of the traffic incident. Other implementations for determining the geographical traffic area are also possible and contemplated.

In block 404, the traffic area processor 202 may determine a plurality of traffic sections for the geographical traffic area. In some embodiments, the traffic area processor 202 may divide the geographical traffic area into the plurality of traffic sections, each traffic section may include one or more road segments and may cover a coverage region having a predefined length (e.g., 150-200 m). In some embodiments, the traffic area processor 202 may determine the plurality of traffic sections based on the roadway structure of the geographical traffic area. For example, the traffic section may include a road segment between 2 adjacent intersections, a road segment between 2 adjacent freeway exits, an on-ramp segment, etc. It should be understood that the coverage regions of different traffic sections in the geographical traffic area may have the same or different shape and size. Other implementations for determining the traffic sections for the geographical traffic area are also possible and contemplated.

In some embodiments, as the traffic incident occurs, the traffic section manager 204 may determine an initial management state for the traffic sections of the geographical traffic area based on the severity metric of the traffic incident. In some embodiments, if the severity metric of the traffic incident satisfies a severity metric threshold (e.g., more than 75%), the traffic section manager 204 may determine the initial management state for the traffic sections of the geographical traffic area to be the centralized management state. As discussed elsewhere herein, in the centralized management state, the traffic sections of the geographical traffic area may be commonly managed by the remote management server 101, and thus the traffic management for the traffic sections may be performed more effectively, with relatively high communication latency and high resource usage cost as compared to the distributed management state. In some embodiments, if the severity metric of the traffic incident does not satisfy the severity metric threshold (e.g., less than or equal to 75%), the traffic section manager 204 may determine the initial management state for the traffic sections of the geographical traffic area to be the distributed management state. As discussed elsewhere herein, in the distributed management state, the traffic sections of the geographical traffic area may be individually managed by its corresponding section server 107, and thus the traffic management for the traffic sections may be performed less effectively, with relatively low communication latency and low resource usage cost as compared to the centralized management state.

In block 406, the traffic section manager 204 may monitor the traffic condition and the responsive vehicle rate in each traffic section of the geographical traffic area. The geographical traffic area may include a plurality of responsive vehicles 103 and a plurality of non-responsive vehicles 109. In some embodiments, the responsive vehicles 103 in the geographical traffic area may transmit their vehicle data (e.g., the vehicle location, the vehicle speed, the following distance, etc.) to the section server 107 and/or to the remote management server 101 at a predefined interval (e.g., every 5 s). In some embodiments, to monitor the responsive vehicle rate of a first traffic section in the geographical traffic area, the traffic section manager 204 may analyze the vehicle data of these responsive vehicles 103, and determine the responsive vehicles 103 located in the first traffic section from the plurality of responsive vehicles 103 in the geographical traffic area based on their vehicle location. The traffic section manager 204 may calculate the responsive vehicle rate of the first traffic section based on the quantity of responsive vehicles 103 that are located in the first traffic section. For example, the traffic section manager 204 may determine the responsive vehicle rate of the first traffic section to be the quantity of responsive vehicles 103 located within the first traffic section (e.g., 25 responsive vehicles).

In some embodiments, to monitor the traffic condition in the first traffic section, the traffic section manager 204 may receive real-time traffic data for the geographical traffic area, and monitor one or more traffic metrics of the first traffic section using the real-time traffic data. For example, the traffic section manager 204 may receive the vehicle data of the responsive vehicles 103 in the geographical traffic area. The traffic section manager 204 may determine the responsive vehicles 103 located within the first traffic section, analyze the vehicle data of these responsive vehicles 103, and calculate one or more traffic metrics describing the traffic condition of the first traffic section (e.g., the vehicle density, the traffic flow rate, the average vehicle speed, the average following distance, etc.) based on the vehicle data of these responsive vehicles 103.

In block 408, the traffic section manager 204 may determine whether the traffic condition of the first traffic section is degraded based on one or more traffic metrics of the first traffic section. In some embodiments, the traffic section manager 204 may determine that a traffic metric of the first traffic section satisfies a corresponding traffic metric threshold (e.g., the average vehicle speed is lower than 25 mph, the vehicle density is higher than 70 vehicles/km, etc.), and thus determine that the traffic condition of the first traffic section is degraded. If the traffic condition of the first traffic section is degraded, the method 400 may proceed to block 410. If the traffic condition of the first traffic section is not degraded, the method 400 may proceed to block 406 to continue monitoring the traffic condition and the responsive vehicle rate in each traffic section of the geographical traffic area.

In block 410, the traffic section manager 204 may determine whether the responsive vehicle rate of the first traffic section satisfies a responsive vehicle rate threshold. If the responsive vehicle rate of the first traffic section does not satisfy the responsive vehicle rate threshold (e.g., less than or equal to 10 responsive vehicles), the traffic section manager 204 may determine that the traffic condition in the first traffic section is degraded, and the quantity of responsive vehicles 103 located within the first traffic section is insufficient to effectively manage the traffic in the first traffic section through coordinating the vehicle movement of these responsive vehicles 103. In this situation, the method 400 may proceed to block 402. In block 402, the traffic area processor 202 may re-determine the geographical traffic area. In some embodiments, the traffic area processor 202 may expand the geographical traffic area to include one or more additional alternative travel routes, and determine the traffic sections for the expanded geographical traffic area with increased coverage region of the traffic sections to potentially include more responsive vehicles 103 in the traffic sections. For example, the traffic area processor 202 may expand the geographical traffic area to include 2 more alternative travel routes, and increase the length of the coverage region of the traffic sections by 50 m. This implementation is advantageous, because it can dynamically adjust the geographical traffic area and the traffic sections so that the quantity of responsive vehicles 103 located within a traffic section is sufficient to impact the traffic in the traffic section through their vehicle movement, and thus the effectiveness of the traffic management applied to the traffic section can be improved. FIG. 7F illustrates an example system architecture 750 in which the geographical traffic area 704 is expanded to additionally include the traffic section 752 associated with the section server 762.

If in block 410, the traffic section manager 204 determines that the responsive vehicle rate of the first traffic section satisfies the responsive vehicle rate threshold (e.g., more than 10 responsive vehicles), the method 400 may proceed to block 412. In block 412, the traffic section manager 204 may determine whether the traffic section manager 204 previously assigned the first traffic section to the first section server 107. If the traffic section manager 204 did not previously assign the first traffic section to the first section server 107 but to the remote management server 101 and thus the first traffic section is currently managed by the remote management server 101, the traffic area processor 202 may determine that the traffic condition of the first traffic section is degraded as the first traffic section is currently managed by the remote management server 101 and the responsive vehicle rate of the first traffic section satisfies the responsive vehicle rate threshold (e.g., more than 10 responsive vehicles). Thus, even when being managed by the remote management server 101 with a relatively high number of responsive vehicles 103 in the first traffic section, the traffic condition of the first traffic section is still degraded. In this situation, the method 400 may proceed to block 402 to re-determine the geographical traffic area and/or the traffic sections in the geographical traffic area as discussed above.

If in block 412, the traffic section manager 204 determines that the traffic section manager 204 previously assigned the first traffic section to the first section server 107 associated with the first traffic section and thus the first traffic section is currently managed by the first section server 107, the traffic area processor 202 may determine that the traffic condition of the first traffic section is degraded as the first traffic section is currently managed by the first section server 107 and the responsive vehicle rate of the first traffic section satisfies the responsive vehicle rate threshold (e.g., more than 10 responsive vehicles). Thus, as the number of responsive vehicles 103 in the first traffic section is relatively high, the effectiveness of the traffic management for the first traffic section may be improved if it is performed by the remote management server 101 instead of the first section server 107. In this situation, the method 400 may proceed to block 414.

In block 414, the traffic section manager 204 may determine a second traffic section located adjacent to the first traffic section among the plurality of traffic sections in the geographical traffic area. In some embodiments, the second traffic section may be located within a predefined distance from the first traffic section (e.g., less than 15 m), and thus the traffic condition in these two traffic sections may impact one another. In some embodiments, the second traffic section may be located directly adjacent to the first traffic section. In block 416, the traffic section manager 204 may aggregate the first traffic section and the second traffic section into an aggregated section. In block 418, the traffic section manager 204 may assign the aggregated section to the remote management server 101 to perform the traffic management for the aggregated section. This implementation is advantageous, because it can increase the responsive vehicle rate of the aggregated section as the aggregated section includes the responsive vehicles 103 located in both first traffic section and second traffic section. As a result, the remote management server 101 can manage the traffic in the aggregated section more effectively through the responsive vehicles 103 located in the aggregated section.

As an example, FIG. 7C illustrates an example system architecture 720 in hybrid management state in which one or more traffic sections in the geographical traffic area may be individually managed by the section servers 107 associated with these traffic sections, while two or more traffic sections may be aggregated into one aggregated section and commonly managed by the remote management server 101. As depicted in FIG. 7C, the traffic section manager 204 may aggregate the traffic sections 702a and 702b into the aggregated section 722a, aggregate the traffic sections 702c and 702d into the aggregated section 722b, and assign the aggregated section 722a and 722b to the remote management server 101. In this example, other traffic sections in the geographical traffic area (e.g., the traffic section 702n) may each be managed by its corresponding section server 107.

In some embodiments, as the aggregated section is managed by the remote management server 101, the traffic section manager 204 may monitor the traffic condition in the aggregated section, and determine whether a traffic metric of the aggregated section satisfies a corresponding traffic metric threshold (e.g., the traffic flow rate is less than 3 vehicles/s, the average vehicle speed is lower than 40 mph, etc.). If the traffic metric of the aggregated section satisfies the corresponding traffic metric threshold, the traffic section manager 204 may determine that the traffic condition in the aggregated section is not improved. In some embodiments, if the traffic condition in the aggregated section is not improved, the traffic section manager 204 may determine one or more third traffic sections that are adjacent to the first traffic section and/or the second traffic section of the aggregated section and have the responsive vehicle rate satisfying a responsive vehicle rate increment threshold (e.g., more than 7 responsive vehicles). The traffic section manager 204 may expand the aggregated section to include the one or more third traffic sections, and the remote management server 101 may then manage the traffic in the expanded aggregated section. This implementation is advantageous, because it can flexibly adjust the aggregated section to increase the quantity of responsive vehicles present in the aggregated section, thereby improving the traffic management performed for the aggregated section by the remote management server 101. Gradually expanding the aggregated section if needed (e.g., by one third traffic section or a predefined number of third traffic sections at a time) can also avoid unnecessarily incorporating too many traffic sections into the aggregated section, thereby limiting the resource amount of the remote management server 101 being utilized to manage the traffic in the aggregated section, and thus the resource usage cost can be reduced.

Figure 5A:
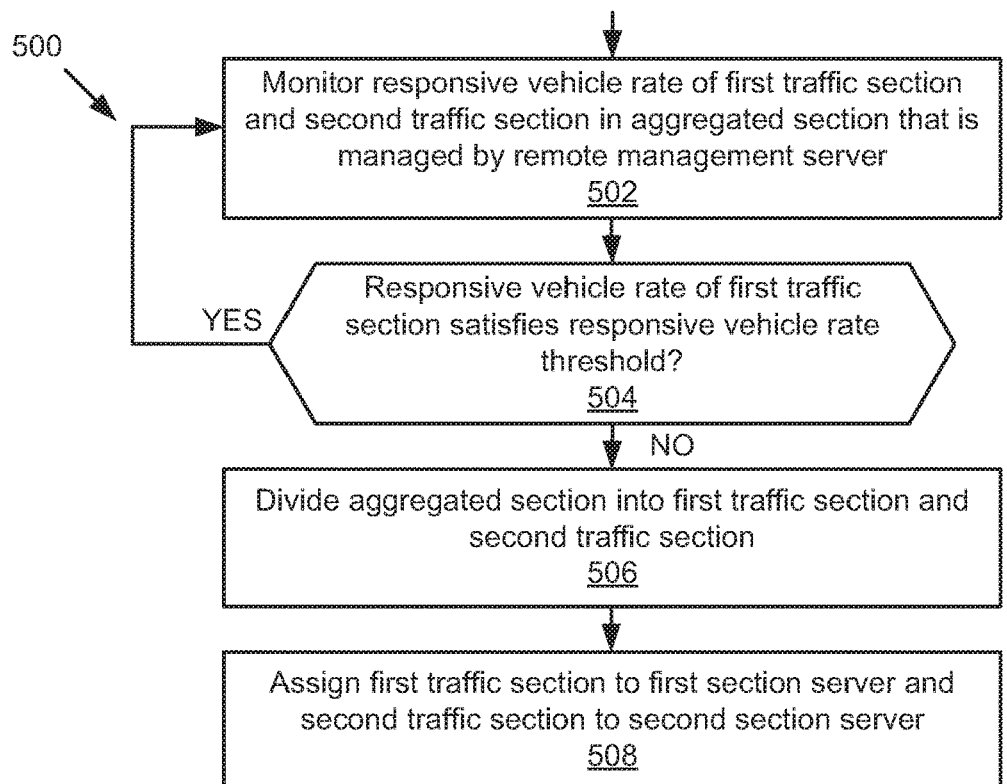

FIG. 5A is a flowchart of an example method 500 for managing the traffic sections in the geographical traffic area. As discussed elsewhere herein, the traffic section manager 204 may previously assign an aggregated section to the remote management server 101, and the aggregated section may include a first traffic section and a second traffic section. In block 502, for the aggregated section that is managed by the remote management server 101, the traffic section manager 204 may monitor the responsive vehicle rate of each traffic section included in the aggregated section. In block 504, the traffic section manager 204 may determine whether the responsive vehicle rate of the first traffic section in the aggregated section satisfies the responsive vehicle rate threshold. If the responsive vehicle rate of the first traffic section satisfies the responsive vehicle rate threshold (e.g., more than 10 responsive vehicles), the method 500 may proceed to block 502 to continue monitoring the responsive vehicle rate of the traffic sections included in the aggregated section. If the responsive vehicle rate of the first traffic section does not satisfy the responsive vehicle rate threshold (e.g., less than or equal to 10 responsive vehicles), the traffic section manager 204 may determine that the number of responsive vehicles in the first traffic section is no longer sufficient to effectively manage the traffic in the first traffic section through coordinating the vehicle movement of these responsive vehicles 103. In this situation, the method 500 may proceed to block 506.

In block 506, the traffic section manager 204 may divide the aggregated section into multiple individual traffic sections that form the aggregated section. In block 508, the traffic section manager 204 may assign each traffic section to the section server 107 associated with the traffic section, and the section server 107 may manage the traffic in the traffic section. For example, in the example system architecture 740 depicted in FIG. 7E, the traffic section manager 204 may split the aggregated section 722a into the first traffic section 702a and the second traffic section 702b. The traffic section manager 204 may then assign the first traffic section 702a to the corresponding first section server 107a, and assign the second traffic section 702b to the corresponding second section server 107b. This implementation is advantageous, because when the traffic management for the traffic section in the aggregated section can no longer be performed effectively by the remote management server 101 due to a decrease in the responsive vehicle rate of the traffic section, the traffic section may then be handed over to the corresponding section server 107 to be managed by the corresponding section server 107. As a result, the resource amount of the remote management server 101 being consumed to perform the traffic management for the geographical traffic area can be limited, and thus the resource usage cost can be reduced.

In some embodiments, the traffic section manager 204 may determine the quantity of traffic sections in the aggregated section that has the responsive vehicle rate not satisfying the responsive vehicle rate threshold. If the quantity of these traffic sections in the aggregated section satisfies a threshold quantity of traffic sections (e.g., more than 2 traffic sections), the traffic section manager 204 may then divide the aggregated section into multiple individual traffic sections, and assign each traffic section to the corresponding section server 107 as discussed above. In some embodiments, if all traffic sections in the aggregated section each has the responsive vehicle rate of the traffic section not satisfying the responsive vehicle rate threshold, the traffic section manager 204 may then divide the aggregated section into multiple individual traffic sections, and assign each traffic section to the corresponding section server 107 as discussed above.

Figure 5B:
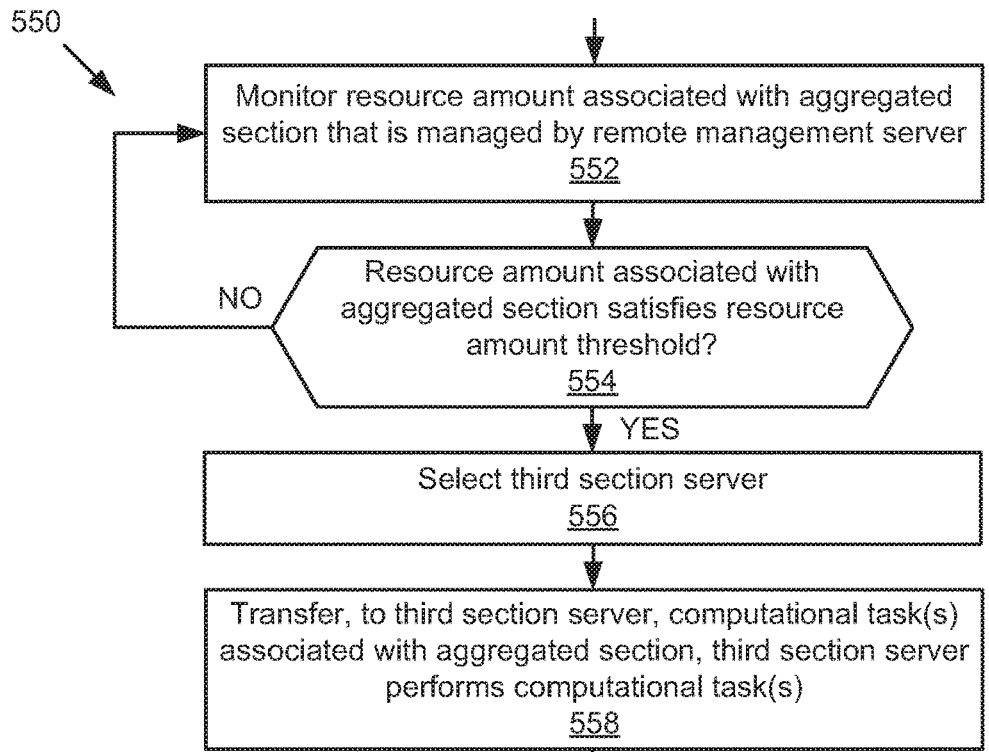

FIG. 5B is a flowchart of an example method 550 for managing the traffic sections in the geographical traffic area. As discussed elsewhere herein, the traffic section manager 204 may previously assign an aggregated section to the remote management server 101, and the aggregated section may include a first traffic section and a second traffic section. In block 552, for the aggregated section that is managed by the remote management server 101, the traffic section manager 204 may monitor the resource amount associated with the aggregated section. The resource amount associated with the aggregated section may indicate the resource amount of the remote management server 101 that is utilized to perform one or more computational tasks to manage the responsive vehicles 103 in the aggregated section. These computational tasks may also be referred to herein as the computational tasks associated with the aggregated section.

In block 554, the traffic section manager 204 may determine whether the resource amount associated with the aggregated section satisfies a corresponding resource amount threshold (e.g., the occupied memory space is higher than 3 GB, the communication bandwidth is higher than 1.5 Mbps, etc.). If the resource amount associated with the aggregated section does not satisfy the corresponding resource amount threshold, the method 550 may proceed to block 552 to continue monitoring the resource amount associated with the aggregated section. If the resource amount associated with the aggregated section satisfies the corresponding resource amount threshold, the traffic section manager 204 may determine that the remote management server 101 utilizes a large amount of its computational resource to perform the traffic management for the traffic sections in the aggregated section, and thus causing a large resource usage cost. In this situation, the method 550 may proceed to block 556. Alternatively, in this situation, the traffic section manager 204 may divide the aggregated section into multiple individual traffic sections that form the aggregated section, and assign each traffic section to its corresponding section server 107 as discussed above with reference to blocks 506 and 508 of FIG. 5A.

Referring back to FIG. 5B, in block 556, the traffic section manager 204 may select a third section server 107 associated with a third traffic section that is distinct from the traffic sections included in the aggregated section (e.g., the first traffic section and the second traffic section). In some embodiments, the third section server 107 may be dedicated to manage the traffic in the third traffic section, and may be a local/regional server or a vehicular server comprising the computing devices 152 of one or more responsive vehicles 103 located in the third traffic section. In some embodiments, the traffic section manager 204 may select the third section server 107 that has the available resource capacity satisfying the resource amount associated with the aggregated section. For example, the third section server 107 may have the available resource capacity equal to or higher than the resource amount of the remote management server 101 that is utilized to perform the computational tasks associated with the aggregated section, and thus the third section server 107 can accommodate the need of computational resource to perform the traffic management for the aggregated section.

In block 558, the traffic section manager 204 may transfer the computational tasks associated with the aggregated section to the third section server 107, and the third section server 107 may perform these computational tasks to manage the traffic in the traffic sections of the aggregated section. This implementation is advantageous, because when a relatively large amount of computational resource of the remote management server 101 is consumed to perform the computational tasks associated with the aggregated section, the computational tasks associated with the aggregated section may be transferred to the third section server 107 to be performed by the third section server 107. As a result, the resource amount of the remote management server 101 being utilized to manage the traffic in the aggregated section can be limited, and thus the resource usage cost can be reduced. The third section server 107 may also be referred to herein as the offload section server 107.

In some embodiments, as the computational tasks associated with the aggregated section are transferred to the third section server 107, the remote management server 101 may continue to receive data from the responsive vehicles 103 located within the traffic sections of the aggregated section, and transmit the data of these responsive vehicles 103 to the third section server 107. Thus, the third section server 107 may perform the computational tasks associated with the aggregated section using the data received from the responsive vehicles 103 located in the traffic sections of the aggregated section.

As an example, FIG. 7D illustrates an example system architecture 730 in which the traffic section manager 204 may transfer the computational tasks associated with the aggregated section 722a to the offload section server 732. In this example, the remote management server 101 may receive the vehicle data from the responsive vehicles 103 located within the first traffic section 702a and the second traffic section 702b of the aggregated section 722a, and transmit the vehicle data of these responsive vehicles 103 to the navigation application 122 implemented on the offload section server 732. The navigation application 122 implemented on the offload section server 732 may analyze the vehicle data of the responsive vehicles 103 located in the traffic sections of the aggregated section 722a, compute the vehicle instructions for each responsive vehicle 103 in the aggregated section 722a, and transmit the vehicle instructions for these responsive vehicle 103 to the remote management server 101. The remote management server 101 may then communicate the vehicle instructions to the corresponding responsive vehicles 103 in the first traffic section 702a and the second traffic section 702b of the aggregated section 722a. Thus, the responsive vehicles 103 in the first traffic section 702a and the second traffic section 702b of the aggregated section 722a may still be commonly managed but their vehicle instructions are generated by the offload section server 732 instead of the remote management server 101.

In some embodiments, the traffic section manager 204 may compute the section distance between the traffic section of the offload section server 732 and the aggregated section 722a, and determine whether the section distance satisfies a section distance threshold (e.g., less than 450 m). If the section distance between the traffic section of the offload section server 732 and the aggregated section 722a satisfies the section distance threshold, the traffic section manager 204 may determine that traffic section of the offload section server 732 is relatively close to the aggregated section 722a. In this situation, the responsive vehicles 103 located within the traffic sections of the aggregated section 722a may transmit their vehicle data directly to the offload section server 732, and the offload section server 732 may communicate the vehicle instructions directly to the corresponding responsive vehicle 103 located in these traffic sections, and thus the communication latency can be reduced.

Figure 6:
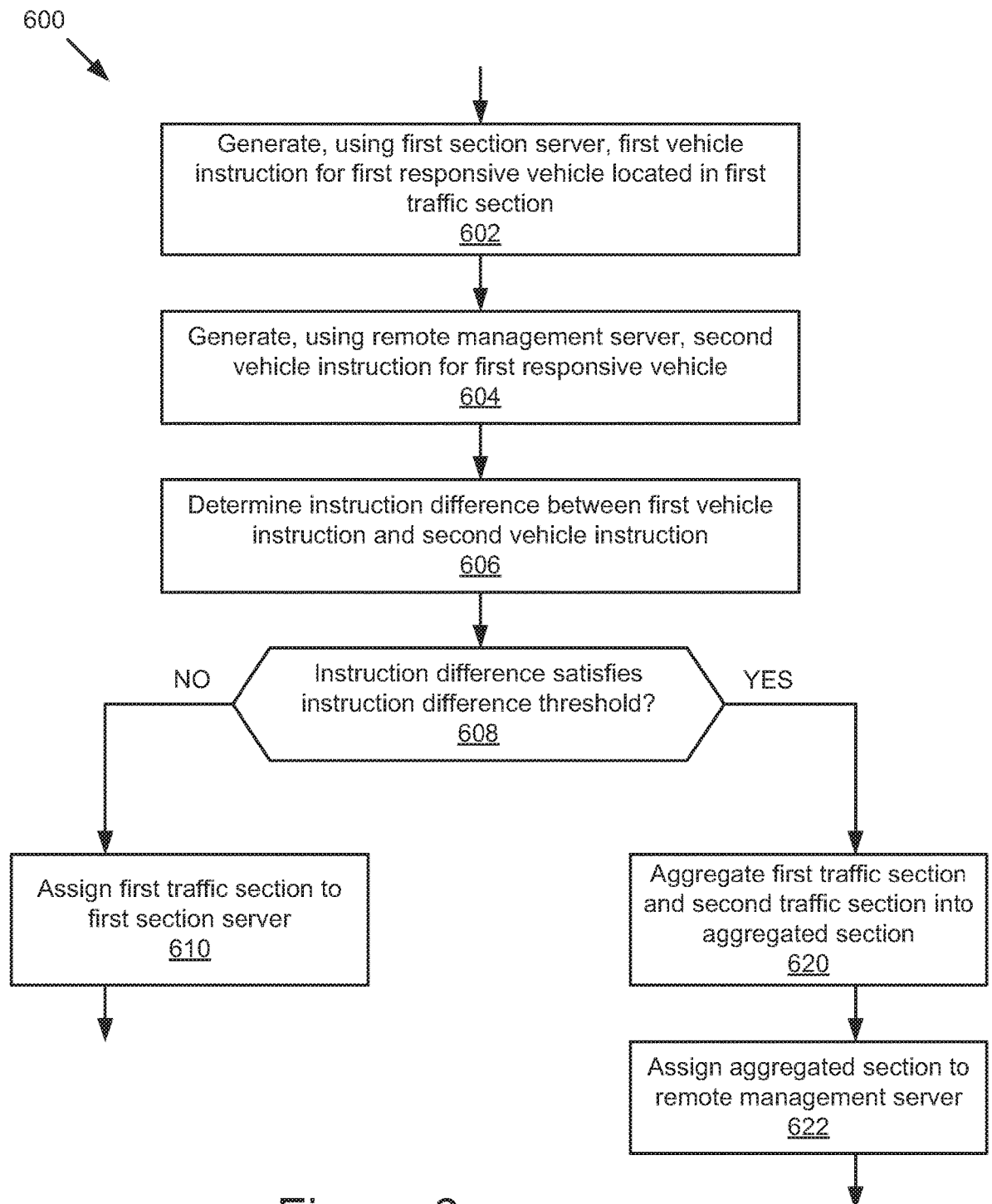

FIG. 6 is a flowchart of an example method 600 for managing the traffic sections in the geographical traffic area. In block 602, for a first responsive vehicle 103 located in a first traffic section associated with a first section server 107, the traffic section manager 204 may instruct the first section server 107 to generate a first vehicle instruction for the first responsive vehicle 103. In some embodiments, the first section server 107 may generate the first vehicle instruction for the first responsive vehicle 103 using the vehicle data of the responsive vehicles 103 located in the first traffic section. As an example, the first section server 107 may determine the driving context based on the vehicle data of the responsive vehicles 103 located in the first traffic section, and generate the first vehicle instruction for the first responsive vehicle 103 to stay in current lane (e.g., lane 1) and proceed in lane 1 at the vehicle speed of 25 mph.

In block 604, the traffic section manager 204 may instruct the remote management server 101 to generate a second vehicle instruction for the same first responsive vehicle 103. In some embodiments, the remote management server 101 may generate the second vehicle instruction for the first responsive vehicle 103 using the vehicle data of the responsive vehicles 103 located in the first traffic section and the vehicle data of the responsive vehicles 103 located in one or more second traffic sections that are adjacent to the first traffic section. The one or more second traffic sections may be located within a predefined distance from the first traffic section (e.g., 50 m), or may be located directly adjacent to the first traffic section in the geographical traffic area. As an example, the remote management server 101 may determine the driving context based on the vehicle data of the responsive vehicles 103 located in the first traffic section and the second traffic section(s), and generate the second vehicle instruction for the first responsive vehicle 103 to make a lane change from lane 1 to lane 3 and proceed in lane 3 at the vehicle speed of 33 mph.

In block 606, the traffic section manager 204 may determine the instruction difference between the first vehicle instruction for the first responsive vehicle 103 generated by the first section server 107 and the second vehicle instruction for the first responsive vehicle 103 generated by the remote management server 101. In block 608, the traffic section manager 204 may determine whether the instruction difference between the first vehicle instruction and the second vehicle instruction satisfies an instruction difference threshold. For example, the traffic section manager 204 may determine whether the vehicle lane in the first vehicle instruction generated for the first responsive vehicle 103 by the first section server 107 is different from the vehicle lane in the second vehicle instruction generated for the first responsive vehicle 103 by the remote management server 101, whether the speed difference between the vehicle speeds computed for the first responsive vehicle 103 in these two vehicle instructions satisfies the vehicle speed threshold (e.g., more than 5 mph), etc.

In some embodiments, if the instruction difference between the first vehicle instruction and the second vehicle instruction does not satisfy the instruction difference threshold, the traffic section manager 204 may determine that the first vehicle instruction for the first responsive vehicle 103 generated by the first section server 107 is relatively similar to the second vehicle instruction for the same first responsive vehicle 103 generated by the remote management server 101. Thus, the traffic section manager 204 may determine that the traffic management performed by the first section server 107 for its corresponding first traffic section may be insignificantly different from the traffic management performed by the remote management server 101 for the first traffic section. In this situation, the method 600 may proceed to block 610. In block 610, the traffic section manager 204 may assign the first traffic section to the first section server 107 associated with the first traffic section.

In some embodiments, if the instruction difference between the first vehicle instruction and the second vehicle instruction satisfies the instruction difference threshold, the traffic section manager 204 may determine that the first vehicle instruction for the first responsive vehicle 103 generated by the first section server 107 is significantly different from the second vehicle instruction for the same first responsive vehicle 103 generated by the remote management server 101. As the remote management server 101 may receive vehicle data from the responsive vehicles 103 located in the first traffic section and the second traffic section(s), the remote management server 101 may determine a comprehensive overall driving context in these traffic sections. As a result, the remote management server 101 may generate the vehicle instructions for the responsive vehicles 103 in these traffic sections to manage the traffic in these traffic sections more effectively, as compared to the first section server 107 that generates the vehicle instructions for the responsive vehicles 103 in the first traffic section using only the vehicle data of the responsive vehicles 103 located in the first traffic section. In this situation, the method 600 may proceed to block 620. In block 620, the traffic section manager 204 may aggregate the first traffic section and the second traffic section(s) into an aggregated section. In block 622, the traffic section manager 204 may assign the aggregated section to the remote management server 101.

This implementation is advantageous, because the traffic section manager 204 may aggregate the first traffic section and the second traffic section(s) and assign the aggregated section to the remote management server 101 only if the remote management server 101 can manage the responsive vehicles 103 in the aggregated section with the vehicle instructions significantly different from the vehicle instructions that the first section server 107 can generate to manage the responsive vehicles 103 in the first traffic section. In that situation, the traffic section manager 204 may assign the aggregated section including the first traffic section to the remote management server 101, and thus the first traffic section can be managed more effectively together with the second traffic section(s) by the remote management server 101. On the other hand, if the vehicle instructions generated for the responsive vehicles 103 in the first traffic section by the first section server 107 and by the remote management server 101 are relatively similar, the first traffic section can be managed by the first section server 107 as effectively as being managed by the remote management server 101. In that situation, the traffic section manager 204 may not assign the first traffic section to the remote management server 101, but to the first section server 107 associated with the first traffic section. As a result, the resource amount of the remote management server 101 being utilized to manage the traffic in the geographical traffic area can be limited, and thus the resource usage cost can be reduced.

In some embodiments, the traffic section manager 204 may determine the traffic metric difference between a traffic metric of the first traffic section and the traffic metric of the second traffic section(s) located adjacent to the first traffic section, and determine whether the traffic metric difference satisfies the corresponding traffic metric difference threshold. If the traffic metric difference satisfies the corresponding traffic metric difference threshold (e.g., the vehicle density difference is higher than 3 vehicles/km, the vehicle speed difference is higher than 5 mph, etc.), the traffic section manager 204 may determine that the traffic condition of the first traffic section is significantly different from the traffic condition of the second traffic section(s) located adjacent to the first traffic section. In that situation, the first traffic section and the second traffic section(s) may likely be managed more efficiently together by the remote management server 101. In some embodiments, in that situation, the traffic section manager 204 may perform the method 600 as discussed above to determine whether to assign the first traffic section to the first section server 107 associated with the first traffic section, or to aggregate the first traffic section and the second traffic section(s) into an aggregated section and assign the aggregated section to the remote management server 101.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, application layer protocols, and/or other communication protocols discussed elsewhere herein.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method comprising:
   determining a plurality of traffic sections for a geographical traffic area, each traffic section including a road segment and one or more vehicles traveling on the road segment;
   monitoring a responsive vehicle rate for a first traffic section of the plurality of traffic sections using location data from one or more global positioning system sensors of the one or more vehicles;
   assigning, based on the responsive vehicle rate of the first traffic section, the first traffic section to one of a first section server dedicated to manage the first traffic section and a remote management server capable of managing the plurality of traffic sections of the geographical traffic area, the first section server comprising one or more computing devices of one or more responsive vehicles in the first traffic section; and
   generating, by the assigned one of the first section server and the remote management server, one or more vehicle instructions for at least one of the one or more vehicles using the location data.

2. The method of claim 1, wherein
   the geographical traffic area includes a plurality of responsive vehicles and a plurality of non-responsive vehicles; and
   monitoring the responsive vehicle rate of the first traffic section includes:
      determining a quantity of responsive vehicles from the plurality of responsive vehicles that are located in the first traffic section; and
      calculating the responsive vehicle rate of the first traffic section based on the quantity of responsive vehicles located in the first traffic section.

3. The method of claim 1, further comprising:
   determining the geographical traffic area based on a severity metric of a traffic incident located downstream of the geographical traffic area, the geographical traffic area including one or more alternative travel routes; and
   dividing the geographical traffic area into the plurality of traffic sections.

4. The method of claim 1, further comprising:
   receiving real-time traffic data for the geographical traffic area;
   monitoring one or more traffic metrics of the first traffic section using the real-time traffic data;
   determining that a traffic condition of the first traffic section is degraded based on the one or more traffic metrics of the first traffic section;
   determining that the responsive vehicle rate of the first traffic section does not satisfy a responsive vehicle rate threshold; and
   responsive to determining that the traffic condition of the first traffic section is degraded and the responsive vehicle rate of the first traffic section does not satisfy the responsive vehicle rate threshold, re-determining the geographical traffic area.

5. The method of claim 1, wherein assigning the first traffic section to one of the first section server and the remote management server includes:
   previously assigning the first traffic section to the first section server;

determining that a traffic condition of the first traffic section is degraded and that the responsive vehicle rate of the first traffic section satisfies a responsive vehicle rate threshold; and responsive to determining that the traffic condition of the first traffic section is degraded and the responsive vehicle rate of the first traffic section satisfies the responsive vehicle rate threshold:

determining a second traffic section located adjacent to the first traffic section among the plurality of traffic sections;

aggregating the first traffic section and the second traffic section into an aggregated section; and assigning the aggregated section to the remote management server.

6. The method of claim 1, wherein assigning the first traffic section to one of the first section server and the remote management server includes:

previously assigning the first traffic section to the remote management server;

determining that a traffic condition of the first traffic section is degraded and that the responsive vehicle rate of the first traffic section satisfies a responsive vehicle rate threshold; and responsive to determining that the traffic condition of the first traffic section is degraded and the responsive vehicle rate of the first traffic section satisfies the responsive vehicle rate threshold, re-determining the geographical traffic area.

7. The method of claim 1, wherein assigning the first traffic section to one of the first section server and the remote management server includes:

previously assigning an aggregated section including the first traffic section and a second traffic section to the remote management server;

determining that the responsive vehicle rate of the first traffic section does not satisfy a responsive vehicle rate threshold; and responsive to determining that the responsive vehicle rate of the first traffic section does not satisfy the responsive vehicle rate threshold:

dividing the aggregated section into the first traffic section and the second traffic section; and assigning the first traffic section to the first section server.

8. The method of claim 1, wherein assigning the first traffic section to one of the first section server and the remote management server includes:

previously assigning an aggregated section including the first traffic section and a second traffic section to the remote management server;

monitoring a resource amount of the remote management server that is utilized to perform one or more computational tasks for the aggregated section;

determining that the resource amount associated with the aggregated section satisfies a resource amount threshold; and responsive to determining that the resource amount associated with the aggregated section satisfies the resource amount threshold:

dividing the aggregated section into the first traffic section and the second traffic section; and assigning the first traffic section to the first section server.

9. The method of claim 1, further comprising:

previously assigning an aggregated section including the first traffic section and a second traffic section to the remote management server;

monitoring a resource amount of the remote management server that is utilized to perform one or more computational tasks for the aggregated section;

determining that the resource amount associated with the aggregated section satisfies a resource amount threshold; and responsive to determining that the resource amount associated with the aggregated section satisfies the resource amount threshold:

selecting a third section server comprising one or more computing devices of one or more responsive vehicles in a third traffic section; and transferring, to the third section server, the one or more computational tasks associated with the aggregated section, the third section server performing the one or more computational tasks.

10. The method of claim 1, wherein assigning the first traffic section to one of the first section server and the remote management server includes:

generating, using the first section server, a first vehicle instruction for a first responsive vehicle located in the first traffic section based on vehicle data of the one or more responsive vehicles in the first traffic section;

generating, using the remote management server, a second vehicle instruction for the first responsive vehicle based on the vehicle data of the one or more responsive vehicles in the first traffic section and vehicle data of one or more responsive vehicles in a second traffic section that is adjacent to the first traffic section;

determining an instruction difference between the first vehicle instruction for the first responsive vehicle and the second vehicle instruction for the first responsive vehicle;

determining that the instruction difference satisfies an instruction difference threshold; and responsive to determining that the instruction difference satisfies the instruction difference threshold:

aggregating the first traffic section and the second traffic section into an aggregated section; and assigning the aggregated section to the remote management server.

11. A system comprising:

one or more processors; and one or more memories storing instructions that, when executed by the one or more processors, cause the system to:

determine a plurality of traffic sections for a geographical traffic area, each traffic section including a road segment and one or more vehicles traveling on the road segment;

monitor a responsive vehicle rate for a first traffic section of the plurality of traffic sections using location data from one or more global positioning system sensors of the one or more vehicles;

assign, based on the responsive vehicle rate of the first traffic section, the first traffic section to one of a first section server dedicated to manage the first traffic section and a remote management server capable of managing the plurality of traffic sections of the geographical traffic area, the first section server comprising one or more computing devices of one or more responsive vehicles in the first traffic section; and generate, by the assigned one of the first section server and the remote management server, one or more vehicle instructions for at least one of the one or more vehicles using the location data.

12. The system of claim 11, wherein:
the geographical traffic area includes a plurality of responsive vehicles and a plurality of non-responsive vehicles; and
monitoring the responsive vehicle rate of the first traffic section includes:
  determining a quantity of responsive vehicles from the plurality of responsive vehicles that are located in the first traffic section; and
  calculating the responsive vehicle rate of the first traffic section based on the quantity of responsive vehicles located in the first traffic section.

13. The system of claim 11, wherein the instructions, when executed by the one or more processors, further cause the system to:
determine the geographical traffic area based on a severity metric of a traffic incident located downstream of the geographical traffic area, the geographical traffic area including one or more alternative travel routes; and
divide the geographical traffic area into the plurality of traffic sections.

14. The system of claim 11, wherein the instructions, when executed by the one or more processors, further cause the system to:
receive real-time traffic data for the geographical traffic area;
monitor one or more traffic metrics of the first traffic section using the real-time traffic data;
determine that a traffic condition of the first traffic section is degraded based on the one or more traffic metrics of the first traffic section;
determine that the responsive vehicle rate of the first traffic section does not satisfy a responsive vehicle rate threshold; and
responsive to determining that the traffic condition of the first traffic section is degraded and the responsive vehicle rate of the first traffic section does not satisfy the responsive vehicle rate threshold, re-determine the geographical traffic area.

15. The system of claim 11, wherein assigning the first traffic section to one of the first section server and the remote management server includes:
previously assigning the first traffic section to the first section server;
determining that a traffic condition of the first traffic section is degraded and that the responsive vehicle rate of the first traffic section satisfies a responsive vehicle rate threshold; and
responsive to determining that the traffic condition of the first traffic section is degraded and the responsive vehicle rate of the first traffic section satisfies the responsive vehicle rate threshold:
  determining a second traffic section located adjacent to the first traffic section among the plurality of traffic sections;
  aggregating the first traffic section and the second traffic section into an aggregated section; and
  assigning the aggregated section to the remote management server.

16. The system of claim 11, wherein assigning the first traffic section to one of the first section server and the remote management server includes:
previously assigning the first traffic section to the remote management server;
determining that a traffic condition of the first traffic section is degraded and that the responsive vehicle rate of the first traffic section satisfies a responsive vehicle rate threshold; and
responsive to determining that the traffic condition of the first traffic section is degraded and the responsive vehicle rate of the first traffic section satisfies the responsive vehicle rate threshold, re-determining the geographical traffic area.

17. The system of claim 11, wherein assigning the first traffic section to one of the first section server and the remote management server includes:
previously assigning an aggregated section including the first traffic section and a second traffic section to the remote management server;
determining that the responsive vehicle rate of the first traffic section does not satisfy a responsive vehicle rate threshold; and
responsive to determining that the responsive vehicle rate of the first traffic section does not satisfy the responsive vehicle rate threshold:
  dividing the aggregated section into the first traffic section and the second traffic section; and
  assigning the first traffic section to the first section server.

18. The system of claim 11, wherein assigning the first traffic section to one of the first section server and the remote management server includes:
previously assigning an aggregated section including the first traffic section and a second traffic section to the remote management server;
monitoring a resource amount of the remote management server that is utilized to perform one or more computational tasks for the aggregated section;
determining that the resource amount associated with the aggregated section satisfies a resource amount threshold; and
responsive to determining that the resource amount associated with the aggregated section satisfies the resource amount threshold:
  dividing the aggregated section into the first traffic section and the second traffic section; and
  assigning the first traffic section to the first section server.

19. The system of claim 11, wherein the instructions, when executed by the one or more processors, further cause the system to:
previously assign an aggregated section including the first traffic section and a second traffic section to the remote management server;
monitor a resource amount of the remote management server that is utilized to perform one or more computational tasks for the aggregated section;
determine that the resource amount associated with the aggregated section satisfies a resource amount threshold; and
responsive to determining that the resource amount associated with the aggregated section satisfies the resource amount threshold:
  select a third section server comprising one or more computing devices of one or more responsive vehicles in a third traffic section; and
  transfer, to the third section server, the one or more computational tasks associated with the aggregated section, the third section server performing the one or more computational tasks.

20. A method comprising:

determining a plurality of traffic sections for a geographical traffic area, each traffic section including a road segment and one or more vehicles traveling on the road segment;

monitoring a traffic condition and a responsive vehicle rate for a first traffic section of the plurality of traffic sections using location data from one or more global positioning system sensors of the one or more vehicles;

assigning, based on the traffic condition and the responsive vehicle rate of the first traffic section, the first traffic section to one of a first section server dedicated to manage the first traffic section and a remote management server capable of managing the plurality of traffic sections of the geographical traffic area, the first section server comprising one or more computing devices of one or more responsive vehicles in the first traffic section; and generating, by the assigned one of the first section server and the remote management server, one or more vehicle instructions for at least one of the one or more vehicles using the location data.

* * * * *